United States Patent
Flynn et al.

(10) Patent No.: US 9,506,388 B2
(45) Date of Patent: Nov. 29, 2016

(54) DEVICE, METHOD, AND SYSTEM FOR EMISSIONS CONTROL

(71) Applicant: General Electric Company, Schenectady, NY (US)

(72) Inventors: Paul Lloyd Flynn, Lawrence Park, PA (US); James Edward Arner, Newport News, VA (US); Shishir Tiwari, Erie, PA (US); Shashi Kiran, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/614,802

(22) Filed: Feb. 5, 2015

(65) Prior Publication Data

US 2015/0144022 A1 May 28, 2015

Related U.S. Application Data

(63) Continuation-in-part of application No. 13/098,509, filed on May 2, 2011, now Pat. No. 8,966,885, and a continuation-in-part of application No. 14/153,539, filed on Jan. 13, 2014.

(60) Provisional application No. 61/875,261, filed on Sep. 9, 2013.

(51) Int. Cl.

| | | |
|---|---|---|
| *F01N 13/00* | (2010.01) | |
| *F01N 3/20* | (2006.01) | |
| *B61C 5/04* | (2006.01) | |
| *F01N 3/023* | (2006.01) | |
| *F01N 3/035* | (2006.01) | |
| *F01N 13/18* | (2010.01) | |
| *F01N 3/021* | (2006.01) | |
| *F01N 3/10* | (2006.01) | |

(52) U.S. Cl.
CPC ............... *F01N 3/2066* (2013.01); *B61C 5/04* (2013.01); *F01N 3/0231* (2013.01); *F01N 3/035* (2013.01); *F01N 13/0097* (2014.06); *F01N 13/017* (2014.06); *F01N 13/1822* (2013.01); *F01N 3/021* (2013.01); *F01N 3/106* (2013.01); *F01N 2510/068* (2013.01); *F01N 2590/08* (2013.01); *Y02T 10/24* (2013.01)

(58) Field of Classification Search
CPC ........... F01N 13/1805; F01N 13/1811; F01N 13/1822; F01N 2340/04; F01N 2590/08; B60K 13/04
See application file for complete search history.

(56) References Cited

U.S. PATENT DOCUMENTS

2008/0060348 A1* 3/2008 Robel ................ B01D 53/9431
60/295

(Continued)

FOREIGN PATENT DOCUMENTS

| JP | WO 2010047199 A1 * | 4/2010 | ............. B60K 13/04 |
| WO | WO 2011087819 A2 * | 7/2011 | ............ F01N 3/0222 |

*Primary Examiner* — Jonathan Matthias
(74) *Attorney, Agent, or Firm* — John A. Kramer; Global Patent Operation

(57) ABSTRACT

Various embodiments for an exhaust gas treatment device for a vehicle system are provided. In one example, the vehicle system includes an engine with a longitudinal axis, where a crankshaft of the engine is parallel to the longitudinal axis and an exhaust gas treatment device mounted on the engine, vertically above the engine such that a longitudinal axis of the exhaust gas treatment device is aligned in parallel with the longitudinal axis of the engine, the exhaust gas treatment device configured to receive exhaust gas from an exhaust manifold of the engine.

20 Claims, 17 Drawing Sheets

(56) References Cited

U.S. PATENT DOCUMENTS

2010/0275588 A1* 11/2010 Kamata ............... B60K 5/1208
60/322

2011/0180344 A1* 7/2011 Kimura ................. B60K 13/04
180/309

2013/0298551 A1* 11/2013 Shin ........................ F01N 13/00
60/605.1

* cited by examiner

DEVICE, METHOD, AND SYSTEM FOR EMISSIONS CONTROL

CROSS-REFERENCE TO RELATED APPLICATIONS

This application is a continuation-in-part of U.S. patent application Ser. No. 13/098,509, entitled DEVICE, METHOD, AND SYSTEM FOR EMISSIONS CONTROL, filed May 2, 2011, and of U.S. patent application Ser. No. 14/153,539, entitled SUPPORT SYSTEM FOR AN AFTERTREATMENT SYSTEM FOR AN ENGINE, filed Jan. 13, 2014, which claims priority to U.S. Patent Application No. 61/875,261, entitled SUPPORT SYSTEM FOR AN AFTERTREATMENT SYSTEM FOR AN ENGINE, filed Sep. 9, 2013, all of which are hereby incorporated in their entireties herein by reference for all purposes.

FIELD

Embodiments of the subject matter disclosed herein relate to exhaust gas treatment devices and systems for an engine.

BACKGROUND

An exhaust gas treatment device may be included in an exhaust system of an engine in order to reduce regulated emissions. In one example, the exhaust gas treatment device may include a diesel particulate filter (DPF) or other particulate matter filter. When a DPF is included, regeneration may be employed to clean the filter by increasing the temperature for burning particulate matter that has collected in the filter. Passive regeneration may occur when a temperature of the exhaust gas is high enough to burn the particulate matter in the filter. In some examples, such as when the DPF is positioned downstream of a turbocharger, the exhaust gas may not have a high enough temperature and active regeneration may be carried out. During active regeneration, fuel may be injected and burned in the exhaust passage upstream of the DPF in order to drive the temperature of the DPF up to a temperature where the particulate matter will burn. As such, fuel consumption is increased, thereby decreasing fuel economy.

Additionally, the exhaust gas treatment device may be suspended above the engine with a support structure mounted to a main frame, or block, of the engine. However, mounting the support structure to the engine main frame may provide a limited number of mounting points along a length of the engine, due to interference with other engine systems. As a result, exhaust aftertreatment support structures may be bulky or provide less support. Further, maintenance of a head of the engine may require removal of the entire support structure and exhaust gas treatment device.

BRIEF DESCRIPTION

In one embodiment, a vehicle system includes an engine with a longitudinal axis, where a crankshaft of the engine is parallel to the longitudinal axis; and an exhaust gas treatment device mounted on the engine, vertically above the engine such that a longitudinal axis of the exhaust gas treatment device is aligned in parallel with the longitudinal axis of the engine, the exhaust gas treatment device configured to receive exhaust gas from an exhaust manifold of the engine.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of a vehicle system including an engine and an exhaust gas treatment device mounted vertically above the engine. For example, a longitudinal axis of the exhaust gas treatment device may be aligned in parallel with a longitudinal axis of the engine and positioned vertically above the engine. A crankshaft of the engine may be parallel to the longitudinal axis. In one example, the exhaust gas treatment device may include one or more selective catalytic reduction (SCR) catalysts. The exhaust gas treatment device may additionally include a particulate filter (PF) and/or additional catalysts (such as an oxidation catalyst). In another example, the exhaust gas treatment device may be a non-SCR system including one or more of a diesel oxidation catalyst (DOC) and a diesel particulate filter (DPF). Additionally, the elements of the exhaust gas treatment device may be coated with various catalytic coatings. Further still the vehicle system may include a turbocharger positioned either upstream or downstream from the exhaust gas treatment device.

Figure 1:
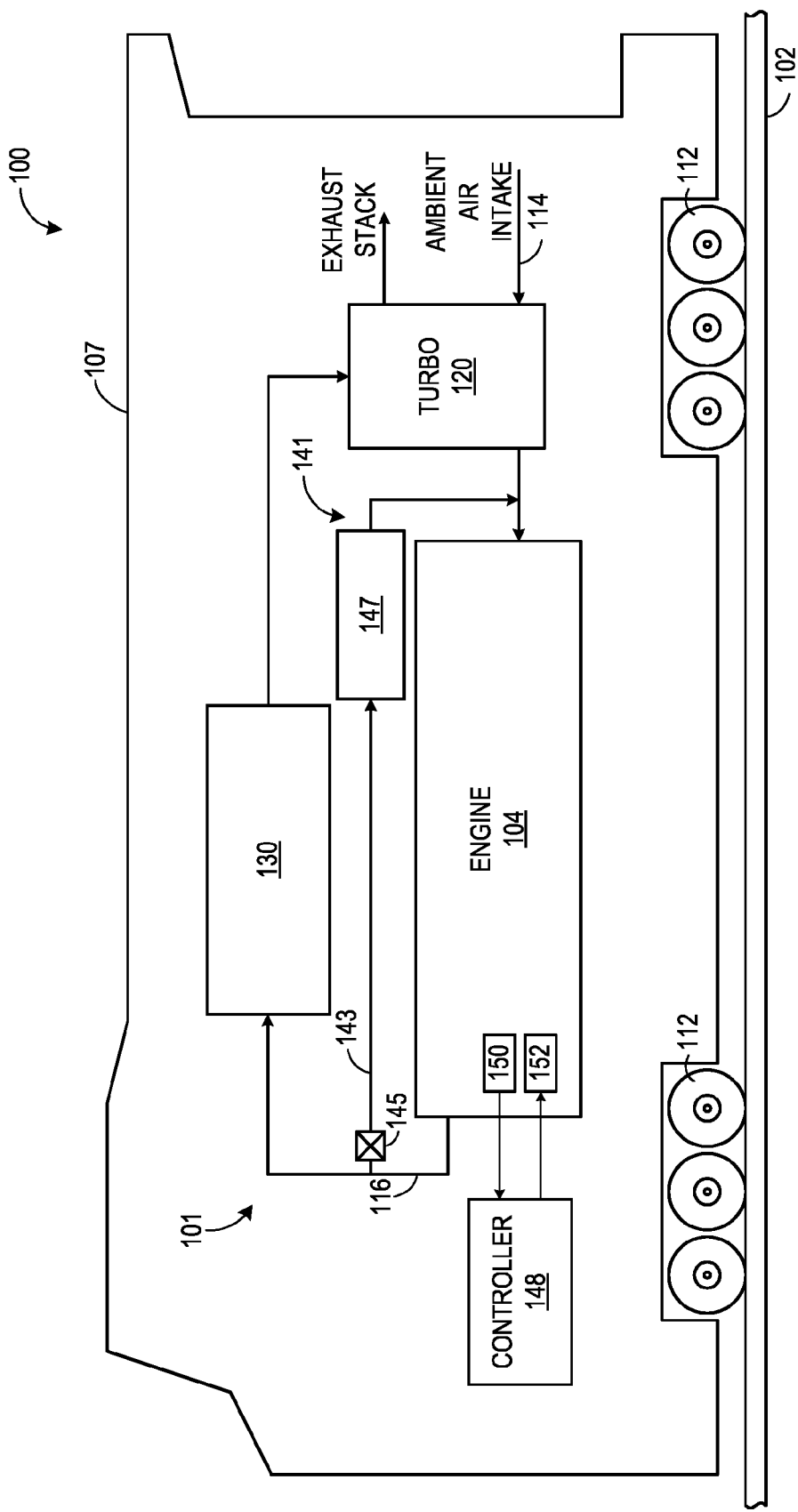
FIG. 1 shows a schematic diagram of an example embodiment of a rail vehicle with an exhaust gas treatment device according to an embodiment of the invention.

FIG. 1 shows an embodiment of a vehicle system including an engine, turbocharger, and exhaust gas treatment device. As shown in FIG. 2 and FIGS. 14-16, the exhaust gas treatment device may be mounted vertically above the engine. The vehicle system may further include a support structure, as depicted in FIGS. 14-21, for mounting the exhaust gas treatment device to the engine and vertically above the engine. Further, the engine and the exhaust gas treatment device may fit within an engine cab, such as the engine cab shown in FIG. 3. The exhaust gas treatment device may include various combinations of treatment devices, such as an oxidation catalyst, a particulate filter, a SCR catalyst, or the like. As one example, the exhaust gas treatment device may include a first substrate coated with a low temperature catalyst configured to operate under a first, low temperature range. As used herein, "low temperature catalyst" implies a catalyst that is active in a relatively low temperature range (e.g., between 150° C. and 300° C.). The exhaust gas treatment device may further include a second substrate coated with a high temperature catalyst positioned downstream of the first substrate, the high temperature catalyst configured to operate under a second, high temperature range. As used herein, "high temperature catalyst" implies a catalyst that is active at relatively high temperatures (e.g., between 300° C. and 600° C.). It should be understood the temperature ranges "between 150° C. and 300° C." and "between 300° C. and 600° C." are provided as examples and are not meant to be limiting. As such, temperatures outside these ranges may also be used. Example arrangements and operation of the catalyst-coated substrates are shown in FIGS. 4-13.

In some embodiments, the low temperature catalyst may facilitate formation of an oxidizer, such as $NO_2$, which consumes particulate matter in the second substrate when exhaust gas temperature is in the first, low temperature range. Further, the high temperature catalyst may facilitate consumption of particulate matter in the second substrate by an exhaust gas constituent, such as $O_2$, when the exhaust gas temperature is in the second, high temperature range. In some examples, the exhaust gas treatment device may be positioned upstream of a turbocharger in an exhaust passage of an engine where exhaust gas has a higher temperature. As such, a build-up of particulate matter in the substrates may be reduced, thereby reducing a frequency of active regeneration In some embodiments, the exhaust gas treatment device may be configured for an engine in a vehicle, such as a rail vehicle. For example, FIG. 1 shows a block diagram of an example embodiment of a vehicle system 100 (e.g., a locomotive system), herein depicted as a rail vehicle 107, configured to run on a rail 102 via a plurality of wheels 112. As depicted, the rail vehicle includes an engine system 101 with an engine 104. In other non-limiting embodiments, engine 104 may be a stationary engine, such as in a power-plant application, or an engine in a marine vessel or off-highway vehicle propulsion system.

The engine receives intake air for combustion from an intake passage 114. The intake passage receives ambient air from an air filter (not shown) that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

The engine system includes a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages.

The engine system 101 further includes an exhaust gas treatment device 130 coupled in the exhaust passage upstream of the turbocharger. As will be described in greater detail below, the exhaust gas treatment device may include one or more components. In one example embodiment, the exhaust gas treatment device may include a diesel oxidation catalyst (DOC) and a diesel particulate filter (DPF), where the DOC is positioned upstream of the DPF in the exhaust gas treatment device. In other embodiments, the exhaust gas treatment device 130 may additionally or alternatively be a selective catalytic reduction (SCR) catalyst, three-way catalyst, $NO_x$ trap, various other emission control devices or combinations thereof. For example, in some embodiments, the exhaust gas treatment device may be a non-SCR system that does not include any SCR catalysts, but may include additional types of catalysts or exhaust gas treatment components, as described further below.

Further, in some embodiments, a burner may be included in the exhaust passage such that the exhaust stream flowing through the exhaust passage upstream of the exhaust gas treatment device may be heated. In this manner, a temperature of the exhaust stream may be increased to facilitate active regeneration of the exhaust gas treatment device. In other embodiments, a burner may not be included in the exhaust gas stream.

The engine system further includes an exhaust gas recirculation (EGR) system 141, which routes exhaust gas from the exhaust passage upstream of the exhaust gas treatment device to the intake passage downstream of the turbocharger. The EGR system includes an EGR passage 143 and an EGR valve 145 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., $NO_x$). The EGR valve may be an on/off valve controlled by the controller 148, or it may control a variable amount of EGR, for example. In some embodiments, as shown in FIG. 1, the EGR system further includes an EGR cooler 147 to reduce the temperature of the exhaust gas before it enters the intake passage. As shown in the non-limiting example embodiment of FIG. 1, the EGR system is a high-pressure EGR system. In other embodiments, the engine system may additionally or alternatively include a low-pressure EGR system, routing EGR from downstream of the turbine to upstream of the compressor.

The rail vehicle further includes a controller 148 to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may be configured to receive signals from a variety of engine sensors 150, as further elaborated herein, in order to determine operating parameters and operating conditions, and correspondingly adjust various engine actuators to control operation of the rail vehicle. For example, the controller may receive signals from various engine sensors 150 including, but not limited to, engine speed, engine load, boost pressure, exhaust pressure, ambient pressure, exhaust temperature, etc. Correspondingly, the controller may control the vehicle system by sending commands to various components such as traction motors, alternator, cylinder valves, throttle, etc. In one example, the controller may adjust the position of the EGR valve in order to adjust an air-fuel ratio of the exhaust gas or to modulate a temperature of the exhaust gas.

Figure 14:
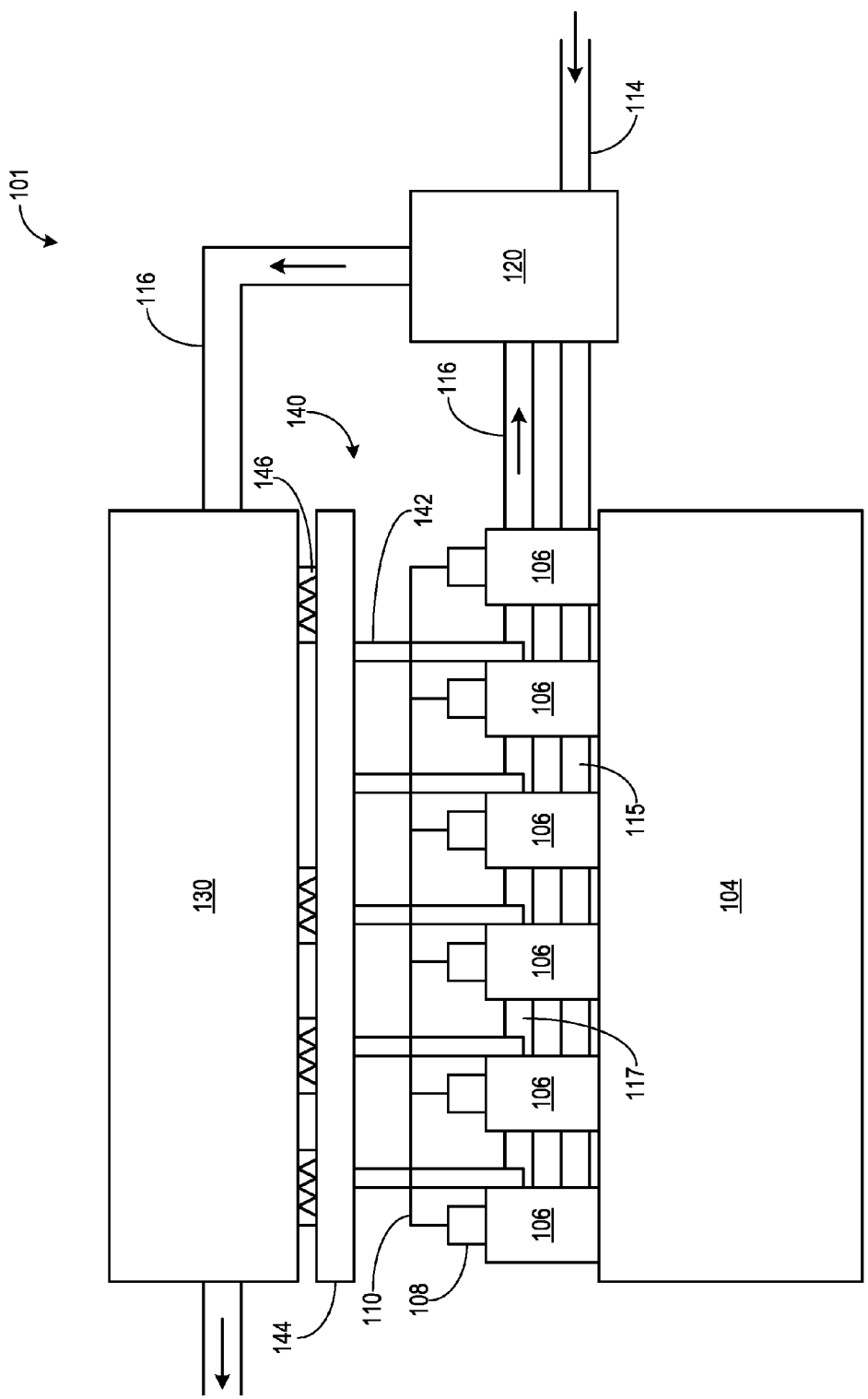
FIG. 14 shows an engine system including an exhaust gas treatment device according to an embodiment of the invention.

In one example embodiment, the vehicle system is a locomotive system which includes an engine cab defined by a roof assembly and side walls. The locomotive system further comprises an engine positioned in the engine cab such that a longitudinal axis of the engine is aligned in parallel with a length of the cab. For example, a crankshaft of the engine is parallel to the longitudinal axis of the engine. Further, an exhaust gas treatment device is included, and is mounted on the engine within a space defined by a top surface of an exhaust manifold of the engine, the roof assembly, and the side walls of the engine cab such that a longitudinal axis of the exhaust gas treatment device is aligned in parallel with the longitudinal axis of the engine. An embodiment of a system for mounting the exhaust gas treatment device vertically above the engine is shown in FIGS. 14-21, as described further below. In one example, the exhaust gas treatment device includes a first substrate coated with a low temperature catalyst positioned upstream of a second substrate coated with a high temperature catalyst. The exhaust gas treatment device may be disposed upstream of a turbine of the turbocharger and is configured to receive exhaust gas from the exhaust manifold of the engine. In an alternate embodiment, the exhaust gas treatment device may include one or more SCR catalysts and may be disposed downstream of the turbine of the turbocharger, as shown in FIG. 14.

Figure 2:
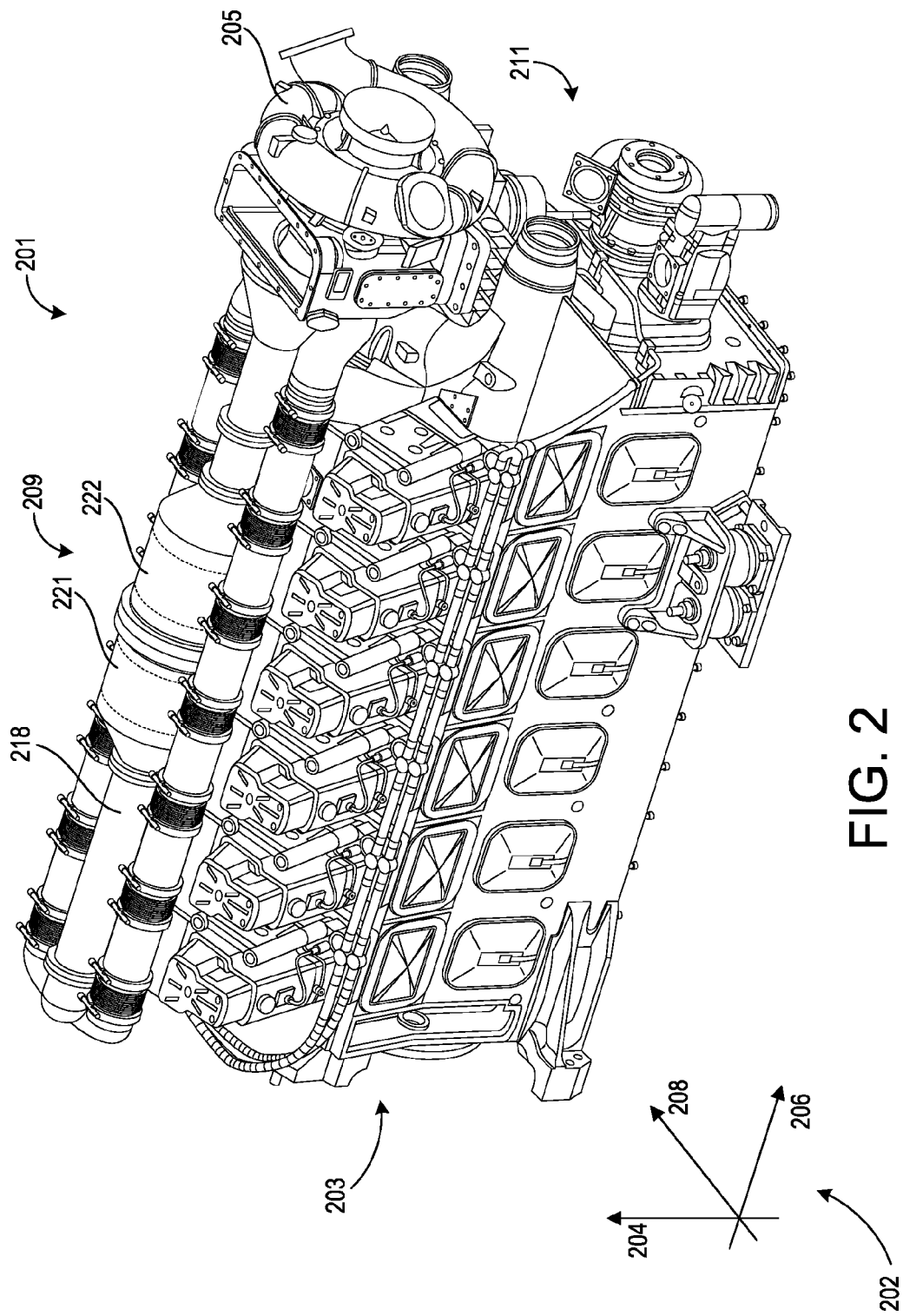
FIG. 2 shows a perspective view, approximately to scale, of an engine with a turbocharger and an exhaust gas treatment device.

Turning to FIG. 2, an example engine system 201 is illustrated, the engine system including an engine 203, such as the engine 104 described above with reference to FIG. 1. FIG. 2 is approximately to-scale. The engine system further includes a turbocharger 205 mounted on a front side of the engine and an exhaust gas treatment device 209 positioned on a top portion of the engine.

In the example of FIG. 2, the engine is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 2, and in FIG. 3, the longitudinal direction is indicated by 206, the vertical direction is indicated by 204, and the lateral direction is indicated by 208 of axis system 202. Each bank of cylinders includes a plurality of cylinders. Each of the plurality of cylinders includes an intake valve which is controlled by a camshaft to allow a flow of compressed intake air to enter the cylinder for combustion. Each of the cylinders further includes an exhaust valve which is controlled by the camshaft to allow a flow of combusted gases (e.g., exhaust gas) to exit the cylinder.

In the example embodiment of FIG. 2, the exhaust gas exits the cylinder and enters an exhaust manifold positioned within the V (e.g., in an inboard orientation). In other embodiments, the exhaust manifold may be in an outboard orientation, for example, in which the exhaust manifold is positioned outside of the V. In the example of FIG. 2, the engine is a V-12 engine. In other examples, the engine may be a V-6, V-16, I-4, I-6, I-8, opposed 4, or another engine type.

As mentioned above, the engine system includes a turbocharger positioned at a front end 211 of the engine. In the example of FIG. 2, the front end of the engine is facing toward a right side of the page. Intake air flows through the turbocharger where it is compressed by a compressor of the turbocharger before entering the cylinders of the engine. In some examples, the engine further includes a charge air cooler which cools the compressed intake air before it enters the cylinder of the engine. The turbocharger is coupled to the exhaust manifold of the engine such that exhaust gas exits the cylinders of the engine and then flows through an exhaust passage 218 and enters an exhaust gas treatment device 209 before entering a turbine of the turbocharger. At locations upstream of the turbocharger, exhaust gas may have a higher temperature and a higher volume flow rate than at locations downstream of the turbocharger due to decompression of the exhaust gas upon passage through the turbocharger.

In other embodiments, the exhaust gas treatment device may be positioned downstream of the turbocharger. As an example, if the exhaust gas treatment device is positioned in a rail vehicle that passes through tunnels (e.g., tunneling), a temperature of the exhaust gas may increase upon passage through a tunnel In such an example, exhaust gas may have a higher temperature after passing through the turbocharger and passive regeneration of the exhaust gas treatment may occur, as will be described in greater detail below.

Figure 3:
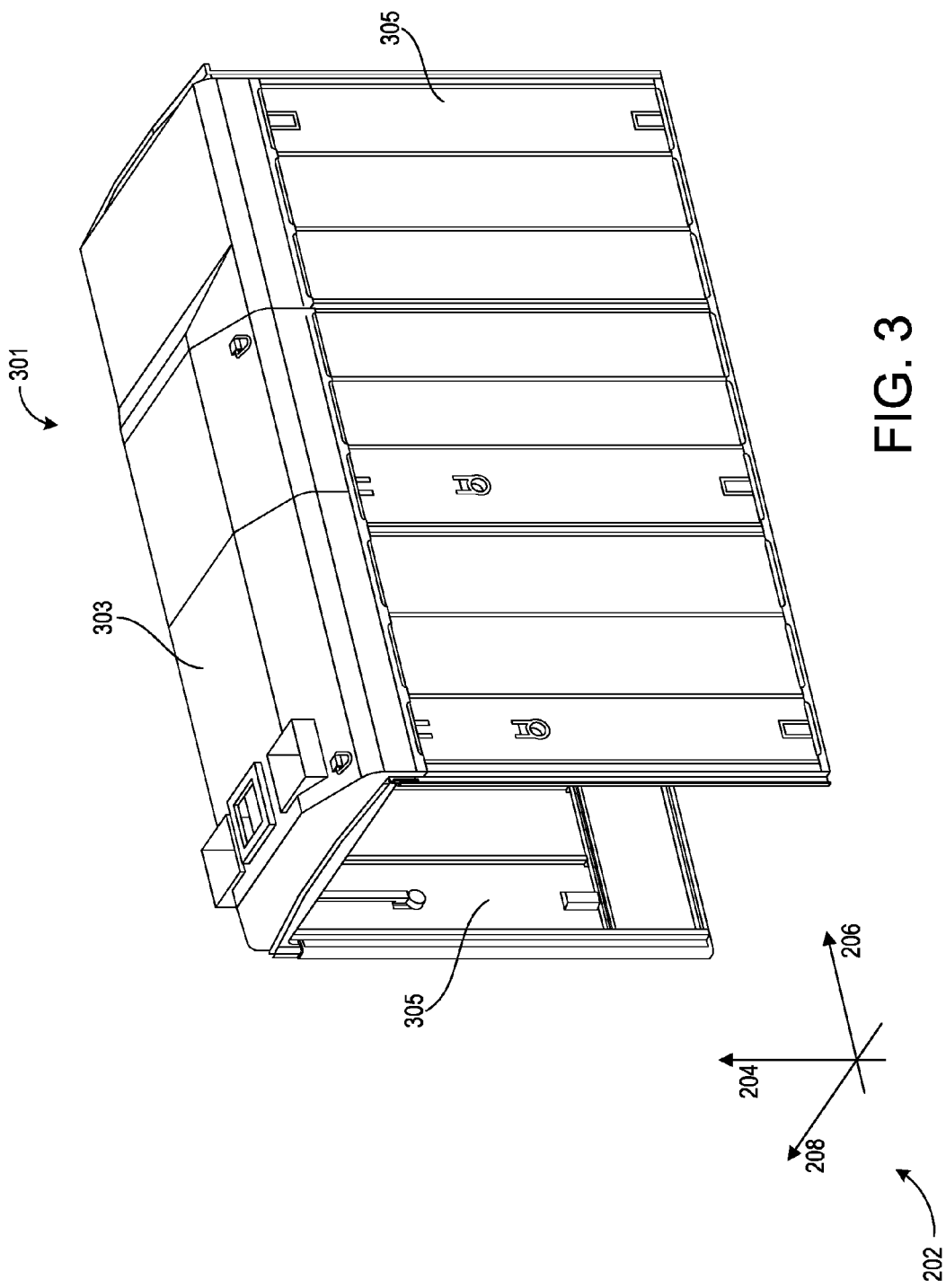
FIG. 3 shows a perspective view, approximately to scale, of an example embodiment of an engine cab.

In the example embodiment shown in FIG. 2, the exhaust gas treatment device is positioned vertically above the engine. The exhaust gas treatment device is positioned on top of the engine such that it fits within a space defined by a top surface of an exhaust manifold of the engine, a roof assembly 303 of an engine cab 301, and the side walls 305 of the engine cab. The engine cab 301 is illustrated in FIG. 3. The engine may be positioned in the engine cab such that the longitudinal axis of the engine is aligned in parallel with a length of the cab. As depicted in FIG. 2, a longitudinal axis of the exhaust gas treatment device is aligned in parallel with the longitudinal axis of the engine. One embodiment of a support structure for supporting the exhaust gas treatment device vertically above the engine is shown in FIGS. 14-21, as described further below. For example, as explained further below with reference to FIGS. 14-21, a first end of the support structure may be coupled to an engine head of the engine and a second end of the support structure may be configured to support (e.g., hold) the exhaust gas treatment device, the second end positioned vertically above the first end with respect to the vertical direction.

The exhaust gas treatment device is defined by the exhaust passage aligned in parallel with the longitudinal axis of the engine. In the example embodiment shown in FIG. 2, the exhaust gas treatment device includes a first substrate coated with a low temperature catalyst 221 and a second substrate coated with a high temperature catalyst 222. As an example, the first substrate coated with the low temperature catalyst 220 may be a DOC and the second substrate coated with the high temperature catalyst 222 may be a cataylzed DPF, as will be described in greater detail below with reference to FIGS. 4 and 5. As shown in FIG. 2, the exhaust gas treatment device is a non-SCR system not including a SCR catalyst.

In other non-limiting embodiments, the engine system may include more than one exhaust gas treatment device, such as DOC, a DPF coupled downstream of the DOC, and a selective catalytic reduction (SCR) catalyst coupled downstream of the diesel particulate filter. In another example embodiment, the exhaust gas treatment device may include an SCR system for reducing $NO_x$ species generated in the engine exhaust stream and a particulate matter (PM) reduction system for reducing an amount of particulate matter, or soot, generated in the engine exhaust stream. The various exhaust after-treatment components included in the SCR system may include an SCR catalyst, an ammonia slip catalyst (ASC), and a structure (or region) for mixing and hydrolyzing an appropriate reductant used with the SCR catalyst, for example. The structure or region may receive the reductant from a reductant storage tank and injection system, for example.

In another embodiment, the exhaust gas treatment device may include a plurality of distinct flow passages aligned in a common direction (e.g., along the longitudinal axis of the engine). In such an embodiment, each of the plurality of flow passages may include one or more exhaust gas treatment devices which may each include a low temperature catalyst and a low temperature catalyst.

By positioning the exhaust gas treatment device on top of the engine such that the exhaust passage is aligned in parallel with the longitudinal axis of the engine, as described above, a compact configuration can be enabled. In this manner, the engine and exhaust gas treatment device can be disposed in a space, such as an engine cab as described above, where the packaging space may be limited.

Further, by positioning the exhaust gas treatment device upstream of the turbocharger, further compaction of the configuration may be enabled. For example, upstream of the turbocharger, exhaust gas emitted from the engine is still compressed and, as such, has a greater volume flow rate than exhaust gas that has passed through the turbocharger. As a result, a size of the exhaust gas treatment device may be reduced.

Figure 4:
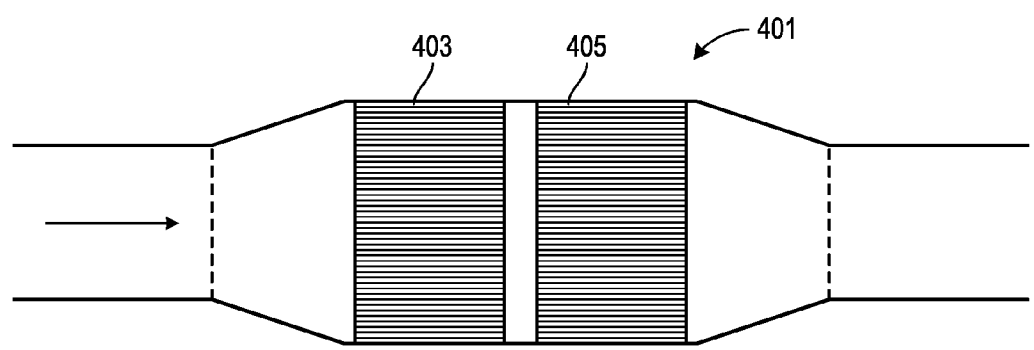
FIG. 4 shows a schematic diagram of an example embodiment of an exhaust gas treatment device according to an embodiment of the invention.

Continuing to FIG. 4, it shows an example embodiment of an exhaust gas treatment device 401 with a first substrate 403 coated with a low temperature catalyst and a second substrate 405 coated with a high temperature catalyst, where the second substrate is disposed downstream of the first substrate, such as exhaust gas treatment device 209 described above with reference to FIG. 2.

The first substrate may be a metallic (e.g., stainless steel, or the like) or a ceramic substrate, for example, with a monolithic honeycomb structure. The low temperature catalyst may be a coating of precious metal such as a platinum group metal (e.g., platinum, palladium, or the like) on the first substrate. Under a low temperature range, such as between 150° C. and 300° C., the low temperature catalyst may facilitate a chemical reaction. As such, the low temperature catalyst may operate during low load or idle conditions. In one embodiment, the low temperature catalyst may be a nitrogen oxide based catalyst that converts NO to $NO_2$. As an example, the first substrate coated with the low temperature catalyst may be a diesel oxidation catalyst.

The second substrate may be a ceramic (e.g., cordierite) or silicon carbide substrate, for example, with a monolithic honeycomb structure. The high temperature catalyst may be a coating of an oxidized ceramic material and/or a mineral on the second substrate. For example, the high temperature catalyst may be a base metal and/or a rare earth oxide (e.g., iron, copper, yttrium, dysprosium, and the like). Under a high temperature range, such as between 300° C. and 600° C., the high temperature catalyst may facilitate a chemical reaction. As such, the high temperature catalyst may operate during high load conditions or, in the case of a rail vehicle, when the rail vehicle is passing through a tunnel In one embodiment, the high temperature catalyst may be an oxygen based catalyst that facilitates particulate matter (e.g., soot) consumption with excess $O_2$ in the exhaust stream. As an example, the second substrate coated with the high temperature catalyst may be a catalyzed diesel particulate filter. In some embodiments, the diesel particulate filter may be a wall flow particulate filter. In other embodiment, the diesel particulate filter may be a flow through particulate filter.

Thus, one embodiment relates to an exhaust gas treatment device. The device comprises a first substrate coated with a low temperature catalyst, which is a platinum group metal (e.g., platinum, palladium, ruthenium, rhodium, osmium, or iridium). The device further comprises a second substrate coated with a high temperature catalyst, which is at least one of a base metal and a rare earth oxide (e.g., iron, nickel, lead, zinc, cerium, neodymium, lanthanum, and the like), positioned downstream of the first substrate. The first and second substrates may be co-located in a common housing, the housing defining a passageway, and the first substrate located on an upstream end of the passageway.

In an embodiment, an exhaust gas treatment device comprised a first substrate coated with a low temperature catalyst, which is a mixture of platinum and rhodium. The device further comprises a second substrate coated with a high temperature catalyst, which is cerium oxide, positioned downstream of the first substrate. The first and second substrates may be co-located in a common housing, the housing defining a passageway, and the first substrate located on an upstream end of the passageway.

In an embodiment, an exhaust gas treatment device comprises a housing defining an internal passageway and a particulate matter filter in the passageway. The exhaust gas treatment device further comprises a first catalyst and a second catalyst disposed in the internal passageway, wherein the first catalyst is configured to oxidize particulate matter in the particulate matter filter in a first, low temperature range, and wherein the second catalyst is configured to oxidize particulate matter in the particulate matter filter in a second, high temperature range, and wherein the first and second catalysts operate to maintain a balance point of particulate loading of the particulate matter filter within a loading range.

Balance point operation of the particulate matter filter may be operation in which particulate matter builds up on the filter at a particular rate and, due to catalyst operation, the particulate matter is consumed at a particular rate. For example, the balance point may be an equilibrium point in which build up and consumption of particulate matter occurs at substantially the same rate. The balance point may be based on engine operation, for example, such as exhaust temperature and engine load. Further, the balance point may be different for different particulate matter filters. As an example, a wall flow particulate matter filter may have a 90 percent capture rate of particulate matter, and a flow through particulate filter may have a 50 to 60 percent capture rate of particulate matter. Thus, the wall flow particulate matter filter may have a higher balance point than the flow through particulate matter filter.

As the balance point increases, particulate matter loading may increase, and as the balance point decreases, particulate matter consumption may increase. As the particulate matter loading reaches a critical point (e.g., the balance point increases to a critical point), active regeneration of the particulate matter filter may be initiated. As an example, the critical point may be a threshold amount of particulate matter in the filter, above which the effectiveness of the particulate matter filter decreases. Thus, the critical point may be a particulate matter filter loading at which active regeneration is initiated to remove particulate matter from the particulate matter filter. As such, the balance point may be maintained in a loading range below the critical point such that initiation of active regeneration is reduced. In one non-limiting embodiment, the loading range of the balance point may be within 20 to 30 percent of a critical point at which active regeneration of the particulate matter filter is initiated.

In another embodiment, an exhaust gas treatment device comprises a housing defining an internal passageway and a particulate matter filter in the passageway. The exhaust gas treatment device further comprises one or more catalysts disposed in the internal passageway, wherein the one or more catalysts are configured to oxidize particulate matter in the particulate matter filter in a first, low temperature range and in a second, high temperature range. Further, the low temperature operation will have a peak effectiveness at a certain temperature (e.g., between 150° C. and 300° C.). The effectiveness of the high temperature operation will increase with higher and higher temperature (e.g., between 300° C. and 600° C.).

Figure 5:
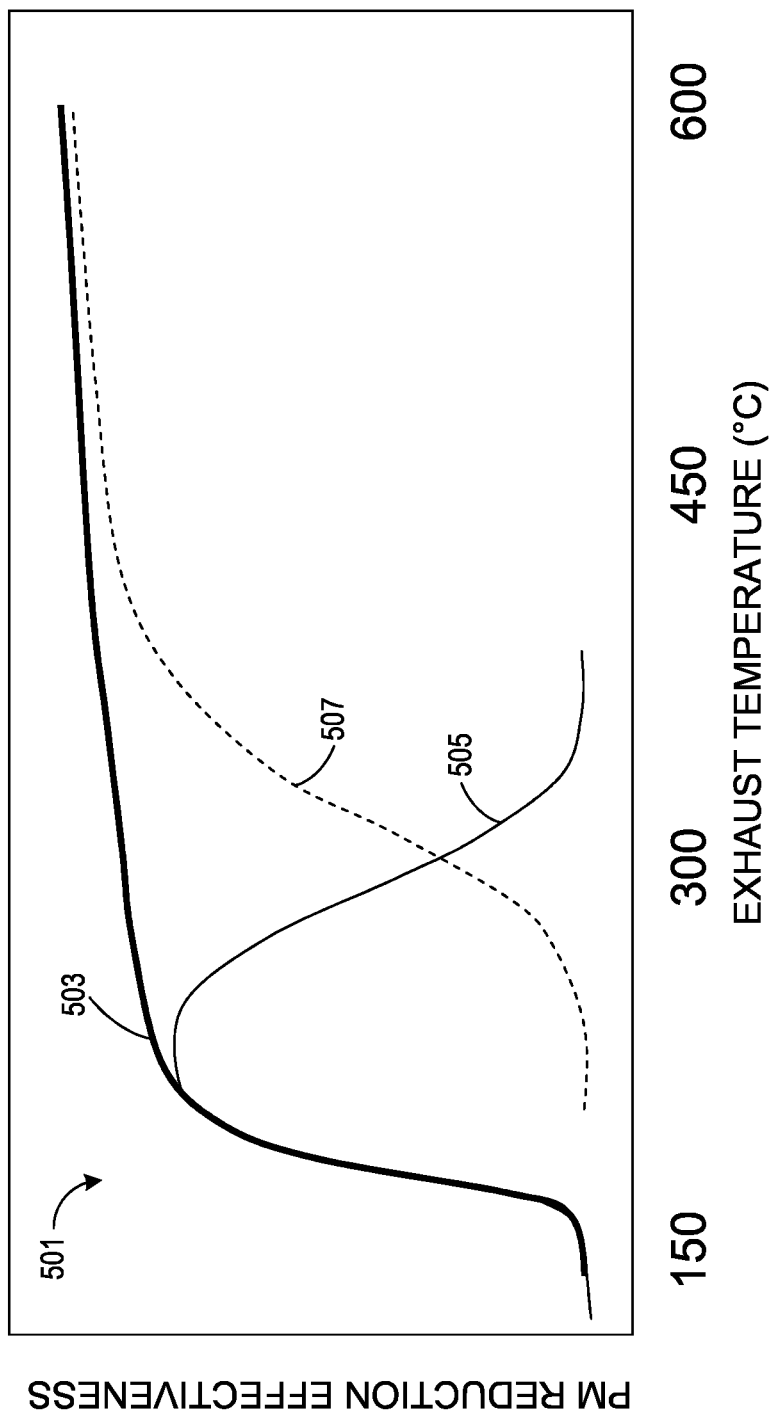
FIG. 5 shows a graph illustrating particulate matter reduction in an exhaust gas treatment device as a function of temperature.

FIG. 5 shows a graph 501 illustrating a particulate matter reduction in an exhaust gas treatment device, such as exhaust gas treatment device 401 described above with reference to FIG. 4, as a function of temperature. Curve 505 shows the temperature range in which the low temperature catalyst (e.g., the diesel oxidation catalyst) is most effective, which is in the temperature range between 150° C. and 300° C. Curve 507 shows the temperature range in which the high temperature catalyst (e.g., the catalyzed diesel particulate filter) is most effective, which is in the temperature range between 300° C. and 600° C.

As indicated by the curve 505 in FIG. 5, at lower exhaust temperatures, soot on the second substrate may be reduced by the low temperature catalyst. Further, at higher exhaust temperatures, the low temperature catalyst may not be effective due to its lower $NO_2$ conversion ratio. As such, the second substrate may be coated with a second, high temperature catalyst that facilitates the reduction of soot at higher exhaust temperatures.

As described above, the low temperature catalyst may be a nitrogen oxide based catalyst that converts NO to $NO_2$. As such, the $NO_2$ formed at the first substrate may flow to the second substrate where it will consume soot, thereby cleaning the second substrate by passive regeneration during periods when the exhaust temperature is relatively low. Further, the high temperature catalyst may be an oxygen based catalyst that facilitates particulate matter consumption with excess $O_2$ in the exhaust stream. As such, during periods when the exhaust temperature is relatively high, soot consumption may occur by passive regeneration.

In other words, the low temperature catalyst (e.g., the DOC) converts NO to $NO_2$, which oxidizes the particulates in the particulate filter. This reaction is effective over the lower temperature range of 150 to 300° C. Above 300° C. the DOC is not effective in converting NO to $NO_2$. In the temperature range over 300° C., the high temperature catalyst (e.g., the particulate filter) is catalyzed to use the $O_2$ in the exhaust gas to oxidize the soot.

Thus, passive regeneration of the second substrate coated with the high temperature catalyst may occur over a wide range of temperatures (e.g., 150° C. and 600° C.), as indicated by curve 503 shown in FIG. 5. In this manner, a need for active regeneration due to particulate matter buildup in the second substrate may be reduced. As such, fuel consumption may be reduced as fuel injection for increasing temperature for active regeneration is reduced.

Figure 6:
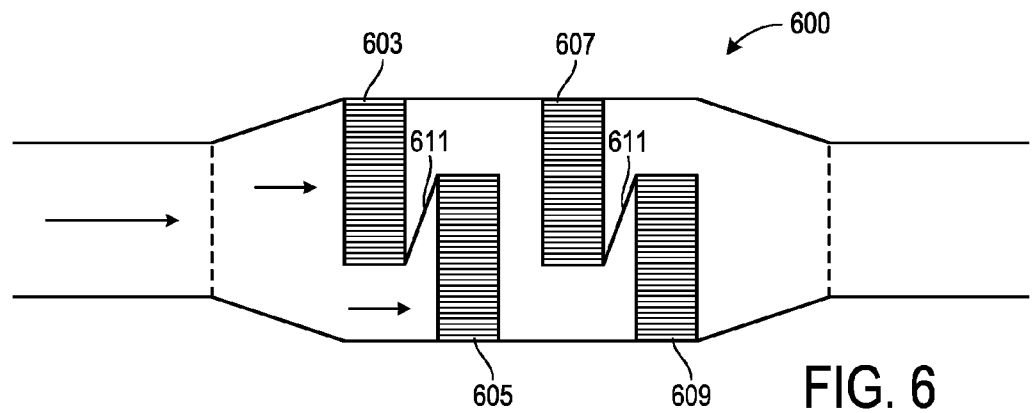
FIG. 6 shows a schematic diagram of an example embodiment of an exhaust gas treatment device according to an embodiment of the invention.

FIG. 6 shows another example embodiment of an exhaust gas treatment device 600. The exhaust gas treatment device 600 includes first substrate coated with a low temperature catalyst and a second substrate coated with a high temperature catalyst, such as the first substrate 403 and the second substrate 405 described above with reference to FIG. 4. In the example embodiment of FIG. 6, each of the catalysts is divided into a plurality of sub-substrates which split the exhaust flow into a corresponding number of portions.

In the example embodiment of FIG. 6, the first substrate is divided into a first sub-substrate 603 and a second sub-substrate 605 disposed downstream of the first sub-substrate 603, thereby splitting the exhaust gas flow into two different portions. As depicted, the first sub-substrate 603 extends partially across a radial extent of the exhaust gas treatment device such that a portion of the radial extent at the location of the first sub-substrate is not filled by the first sub-substrate. As such, a first portion of exhaust gas flows through the first sub-substrate 603 and a second portion of exhaust gas bypasses the first sub-substrate 603 and flows through the second sub-substrate 605. As depicted, the second sub-substrate 605 extends partially across a radial extent of the exhaust gas treatment device such that a portion of the radial extent at the second sub-substrate is not filled by the second sub-substrate. In some embodiments, the first sub-substrate 603 and the second sub-substrate 605 may be coated by the same low temperature catalyst. In other embodiments, the first sub-substrate 603 and the second sub-substrate 605 may be coated by different low temperature catalysts.

Further, a flow divider 611 interconnects distal edges of the first sub-substrate 603 and the second sub-substrate 605 that are not abutting the walls of the exhaust gas treatment device 600. In this manner, the flow divider channels exhaust gas around each of the sub-substrates 603 and 605 such that each portion of exhaust gas flow flows through only one of the sub-substrates 603 and 605.

Further, in the example embodiment of FIG. 6, the second substrate is divided into a first sub-substrate 607 and a second sub-substrate 609 disposed downstream of the first sub-substrate, thereby splitting the exhaust gas flow into two different portions. The second substrate is disposed downstream of the first substrate. As depicted, the first sub-substrate 607 extends partially across a radial extent of the exhaust gas treatment device such that a portion of the radial extent at the location of the first sub-substrate is not filled by the first sub-substrate. As such, a first portion of exhaust gas flows through the first sub-substrate 607 and a second portion of exhaust gas bypasses the first sub-substrate 607 and flows through the second sub-substrate 609. As depicted, the second sub-substrate 609 extends partially across a radial extent of the exhaust gas treatment device such that a portion of the radial extent at the second sub-substrate is not filled by the second sub-substrate. In some embodiments, the first sub-substrate 607 and the second sub-substrate 609 may be coated by the same high temperature catalyst. In other embodiments, the first sub-substrate 607 and the second sub-substrate 609 may be coated by different high temperature catalysts.

Further, a flow divider 611 interconnects distal edges of the first sub-substrate 607 and the second sub-substrate 609 that are not abutting the walls of the exhaust gas treatment device 600. In this manner, the flow divider channels exhaust gas around each of the sub-substrates 607 and 609 such that each portion of exhaust gas flow flows through only one of the sub-substrates 607 and 609.

By dividing the first sub-substrate into two sub-substrates 603 and 605, and dividing the second substrate into two sub-substrates 607 and 609, a surface area through which exhaust gas flows may be increased and a length along which each portion flows may be decreased, thereby reducing a pressure drop on the system. Further, in such a configuration, a size of the exhaust gas treatment device may be reduced thus enabling the device to be positioned in a system that has limited space. As such, a more compact exhaust gas treatment device may be enabled, the more compact exhaust gas treatment device capable of passive regeneration over a wide range of temperatures, as described with reference to FIGS. 4 and 5.

It should be understood FIG. 6 is provided as an example. The exhaust gas treatment device may include any suitable number of sub-substrates splitting the exhaust flow into a corresponding number of flow paths. In some embodiments, only the first substrate may be divided or only the second substrate may be divided. Further, a size and shape of each sub-substrate may vary based on the configuration of the sub-substrates within the exhaust gas treatment device.

Figure 7:
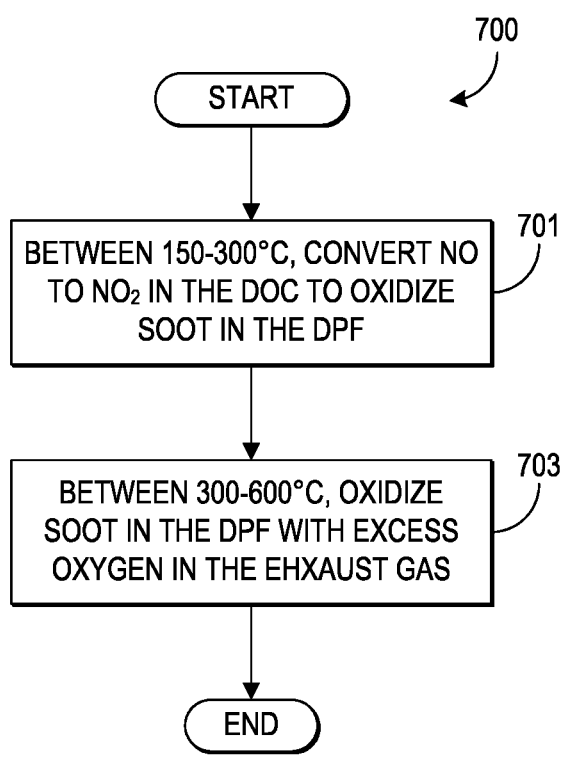
FIG. 7 shows a flow chart illustrating a method for an exhaust gas treatment device.

FIG. 7 shows a high level flow chart illustrating a method 700 for an exhaust gas treatment device, such as the exhaust gas treatment device 401 or 600 described above with reference to FIGS. 4 and 6, respectively.

At 701 of method 700, under exhaust gas temperatures between 150° C. and 300° C., nitric oxide (NO) is converted to nitrogen dioxide ($NO_2$) in the diesel oxidation catalyst (DOC). As described above, the DOC may be coated with a low temperature catalyst, such as platinum, which facilitates the reaction. The $NO_2$ formed in the DOC flows to the diesel particulate filter (DPF) where it oxidizes particulate matter, such as soot, thereby passively regenerating the DPF at low temperatures.

At 703 of method 700, under exhaust gas temperatures between 300° C. and 600° C., particulate matter such as soot is oxidized in the DPF with excess oxygen in the exhaust gas, thereby passively regenerating the DPF at high temperatures. As described above, the DPF may be coated with a high temperature catalyst which facilitates the oxidation of soot.

Thus, the DPF may be regenerated by passive regeneration over a wide range of temperatures. In this manner, fuel consumption may be reduced, thereby increasing fuel economy, as active regeneration may be carried out less frequently due to an increase in passive regeneration.

Another embodiment relates to an exhaust gas treatment device. The device comprises a first substrate and a second substrate positioned downstream of the first substrate. (For example, the first and second substrates may be located in a common passageway defined by a housing.) The first substrate is coated with a low temperature catalyst configured to operate under a first, low temperature range. The low temperature catalyst converts nitric oxide to nitrogen dioxide in the first, low temperature range. The second substrate is coated with a high temperature catalyst. The high temperature catalyst is configured to operate under a second, high temperature range. In the first and second temperature ranges, particulate matter is oxidized at the second substrate. More specifically, the nitrogen dioxide (generated by the low temperature catalyst and traveling downstream to the second substrate) oxidizes particulate matter in the second substrate in the first, low temperature range. Additionally, the high temperature catalyst reduces particulate matter in the second substrate with oxygen in exhaust gas when a temperature of the exhaust gas is in the second, high temperature range.

In another embodiment, an exhaust gas treatment device comprises a diesel oxidation catalyst and a diesel particulate filter located downstream of the diesel oxidation catalyst. The diesel oxidation catalyst has a first catalyst for converting nitric oxide to nitrogen dioxide for oxidizing particulate matter in the diesel particulate filter in a first, low temperature range. The diesel particulate filter has a second catalyst for oxidizing particulate matter in the diesel particulate filter in a second, high temperature range.

In another embodiment, an exhaust gas treatment device comprises a housing defining an internal passageway, a particulate matter filter in the passageway, and a plurality of catalysts disposed in the internal passageway. The plurality of catalysts is configured to oxidize particulate matter in the particulate matter filter in a first, low temperature range and in a second, high temperature range (e.g., one catalyst may work in the low temperature range, and another catalyst in the high temperature range).

In some examples, an engine system may be retrofitted with an exhaust gas treatment device as described in any of the embodiments herein. The exhaust gas treatment device may be added to the engine system in any suitable location in the exhaust passage, for example, the exhaust gas treatment device may be installed upstream or downstream of the turbine of the turbocharger.

Further, in some examples, an engine may be serviced by replacing an exhaust gas treatment device with an exhaust gas treatment device as described in any of the embodiments herein. In such an example, the exhaust gas treatment device may be replaced such that fuel economy of the engine system may be increased.

Figure 8:
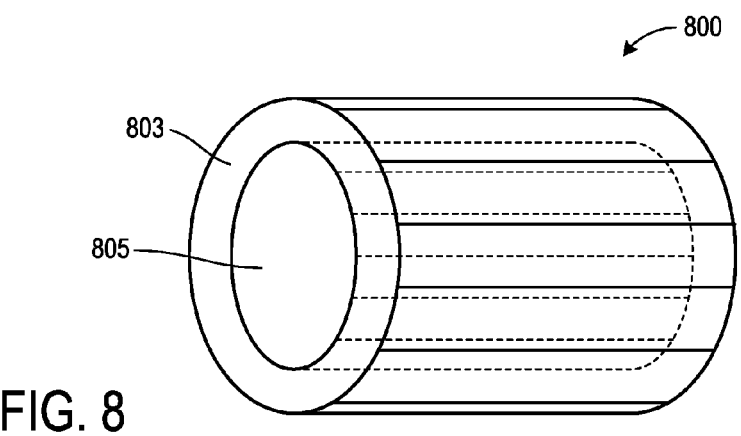
FIG. 8 shows a perspective view of an oxidation catalyst device according to an embodiment of the invention.
Figure 9:
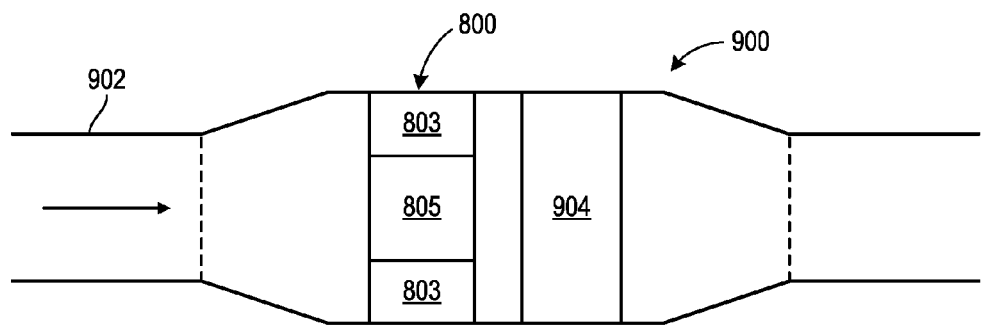
FIG. 9 shows a schematic diagram of an exemplary embodiment of an exhaust gas treatment device which includes the oxidation catalyst device depicted in FIG. 8.
Figure 10:
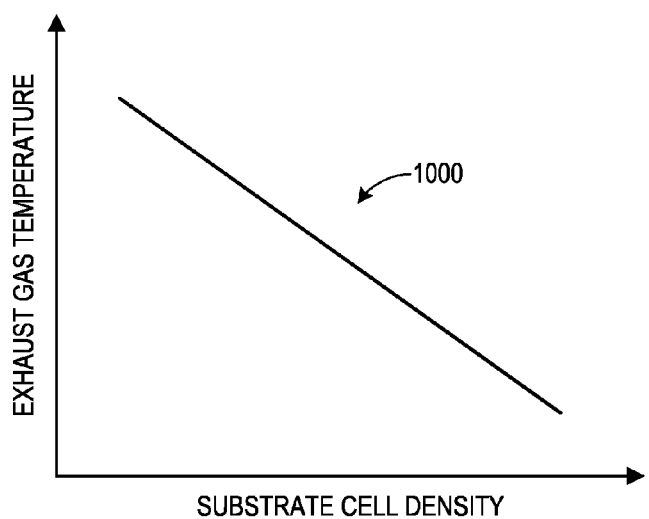
FIG. 10 shows a graph illustrating flow through a substrate based on exhaust gas temperature and substrate cell density.
Figure 11:
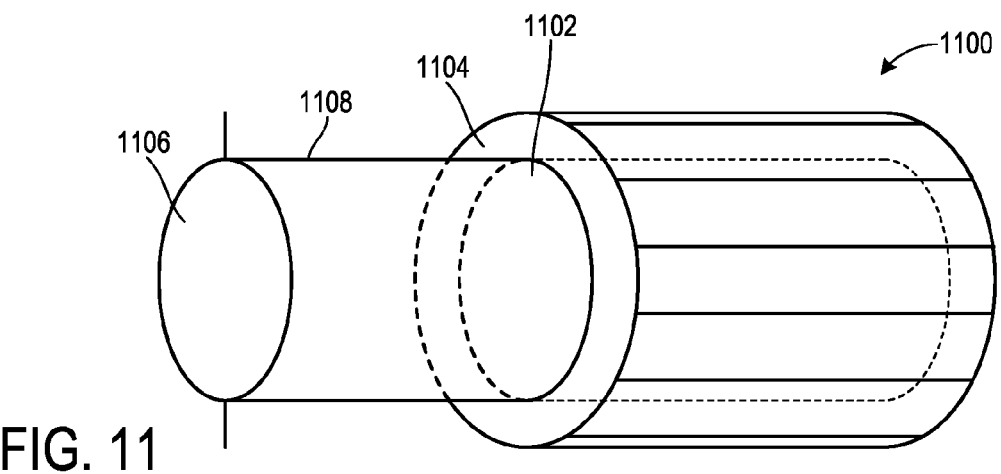
FIG. 11 shows a perspective view of an oxidation catalyst device according to an embodiment of the invention.
Figure 12:
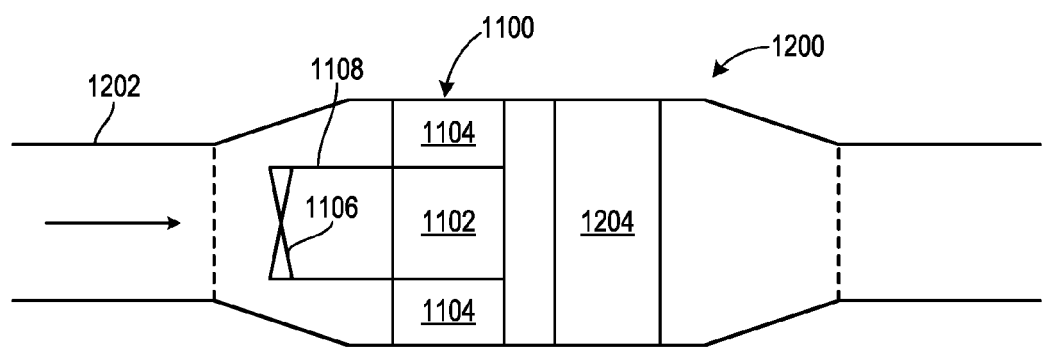
FIG. 12 shows a schematic diagram of an exemplary embodiment of an exhaust gas treatment device which includes the oxidation catalyst device depicted in FIG. 11.

FIGS. 8-11 show additional possible arrangements for the exhaust gas treatment device introduced above with reference to FIGS. 1-2. For example, FIGS. 8-11 show embodiments of an oxidation catalyst, such as a diesel oxidation catalyst (DOC), and embodiments of the oxidation catalyst disposed in an exhaust gas treatment device. In particular, FIG. 8 shows an exemplary embodiment of an oxidation catalyst device which includes a first substrate and a second substrate positioned coaxially, while FIG. 9 shows an example embodiment of the oxidation catalyst device depicted in FIG. 8 disposed in an exhaust gas treatment device. FIG. 11 shows an exemplary embodiment of an oxidation catalyst device with a first substrate, a second substrate positioned coaxially with the first substrate, and a flow control element which controls flow through the first substrate. FIG. 12 shows an exemplary embodiment of the oxidation catalyst device depicted in FIG. 11 disposed in an exhaust gas treatment device.

FIG. 8 shows an oxidation catalyst device 800 with a first substrate 803 and a second substrate 805 positioned coaxially with the first substrate. The first substrate may be a metallic (e.g., stainless steel, or the like) or a ceramic substrate, for example, with a monolithic honeycomb structure. Similarly, the second substrate may be a metallic (e.g., stainless steel, or the like) or a ceramic substrate, for example, with a monolithic honeycomb structure. In some examples, the first substrate and the second substrate may be made of the same material. In other examples, the first substrate and the second substrate may be made of different materials.

The first substrate may be coated with a low temperature catalyst. As an example, the low temperature catalyst may be platinum. Under a low temperature range, such as between 300° C. and 500° C., the low temperature catalyst may facilitate a chemical reaction. As such, the low temperature catalyst may operate during low load or idle conditions when an exhaust temperature is relatively low. In one embodiment, the low temperature catalyst may facilitate conversion of CO and hydrocarbons to water and $CO_2$. The low temperature catalyst may further be a nitrogen oxide-based catalyst which facilitates conversion of NO to $NO_2$.

The second substrate may be coated with a high temperature catalyst. As an example, the high temperature catalyst may be a mixture of platinum and palladium. In one example, the high temperature catalyst may be made of four parts platinum and one part palladium by weight. Under a high temperature range, such as between 500° C. and 600° C., the high temperature catalyst may facilitate a chemical reaction. As such, the high temperature catalyst may operate during conditions when an exhaust temperature is relatively high. Conditions in which the exhaust gas temperature is relatively high may include tunneling operation in which the vehicle is travelling through a tunnel, active regeneration of the particulate filter in which the exhaust gas temperature is increased to facilitate regeneration of the particulate filter, and/or conditions in which degradation of a component such as a turbocharger has occurred. In one embodiment, the high temperature catalyst may facilitate conversion of CO and hydrocarbons to water and $CO_2$. The high temperature catalyst may further be a nitrogen oxide-based catalyst which facilitates conversion of NO to $NO_2$.

In one embodiment, each of the two substrates may have a different cell density. For example, the first substrate may have a higher cell density than the second substrate. In one example, the first substrate may have a cell density between 46.5 and 77.5 cell per square centimeter (300 and 500 cells per square inch) and the second substrate may have a cell density of less than 46.5 cells per square centimeter. In one non-limiting embodiment, the second substrate may have a cell density of 31 cells per square centimeter (200 cells per square inch). In this manner, the flow resistance between the substrates may be different, and as such, higher temperature and lower temperature exhaust gas flows may be more likely to flow through one substrate or the other and the exhaust gas flow may be passively directed through one substrate or the other based on the temperature. As an example, the first substrate with the higher cell density may form a first flow path along which exhaust gas flows at lower temperatures and the second substrate with the lower cell density may form a second flow path along which exhaust gas flows at higher temperatures.

As an example of the dependence of flow through a substrate and cell density, FIG. 10 shows a graph 1000 illustrating an example of flow through a substrate based on exhaust gas temperature and substrate cell density. As depicted in FIG. 10, exhaust gas flow at a lower temperature prefers a higher substrate cell density. Exhaust gas flow at a higher temperature prefers a lower substrate cell density. By coating the substrate with a higher cell density with the low temperature catalyst and coating the substrate with the lower cell density with the high temperature catalyst, high temperature exhaust gas flows may be more likely to flow through the substrate with the lower cell density coated with the high temperature catalyst. In this manner, the degradation of the low temperature catalyst may be reduced during conditions in which the exhaust temperature is high. In some examples, lower temperature exhaust gas may flow through the first substrate (e.g., 803) coated with the low temperature catalyst and the second substrate (e.g., 805) coated with the high temperature catalyst.

Referring back to FIG. 8, the second substrate coated with the high temperature catalyst is positioned in the center of the oxidation catalyst device and the first substrate coated with the low temperature catalyst surrounds the circumference of the second substrate. It should be understood that the oxidation catalyst is not limited to this configuration. In other embodiments, the first substrate coated with the low temperature catalyst may be positioned in the center of the oxidation catalyst and the second substrate coated with the high temperature catalyst may surround the circumference of the first substrate.

By positioning the first substrate and the second substrate coaxially, each of the substrates and are in the proximity of the heat source (e.g., the exhaust gas). As such, when exhaust gas flow to one of the substrates is reduced, the temperature of the other substrate may not drop significantly such that it falls below its activation temperature. For example, when a high temperature exhaust flow flows primarily through the second substrate coated with the high temperature catalyst and the first substrate coated with the low temperature catalyst receives a reduced exhaust gas flow, the temperature of the first substrate may not drop below its activation temperature. In this manner, when the exhaust gas temperature decreases such that exhaust flow through the first substrate increases, the first substrate coated with the low temperature catalyst is ready for conversion of NO to $NO_2$ without having to wait for the first substrate to warm-up.

Turning now to FIG. 9, an exemplary embodiment of an exhaust gas treatment device 900 disposed in an exhaust passage 902 is depicted. The exhaust gas treatment device 900 includes the oxidation catalyst device 800 described above with reference to FIG. 8. As depicted, the exhaust gas treatment device 900 further includes a particulate filter 904, such as a DPF, disposed downstream of the first substrate 803 and the second substrate 805 of the oxidation catalyst device 800. The particulate filter may include a substrate such as a ceramic (e.g., cordierite) or silicon carbide substrate, for example, with a monolithic honeycomb structure. In some examples, such as described above with reference to FIGS. 4 and 6, the particulate filter may be a catalyzed particulate filter coated with a catalyst. As an example, the particulate filter may be coated with a catalyst such as an oxidized ceramic material and/or a mineral, as described above. In some embodiments, the diesel particulate filter may be a wall flow particulate filter. In other embodiments, the diesel particulate filter may be a flow through particulate filter.

By positioning the particulate filter downstream of the oxidation catalyst, an oxidizer generated by the oxidation catalyst device, such as $NO_2$, may flow to the particulate filter, thereby facilitating the oxidation of particulate matter trapped in the particulate filter. In this way, passive regeneration of the particulate filter may be carried out over a range of exhaust gas temperatures (e.g., 300-600° C.), and a need for active regeneration of the particulate filter may be reduced.

FIG. 11 shows another example of an oxidation catalyst device 1100, such as a DOC, which includes a first substrate 1102 coated with a first, low temperature catalyst and a second substrate 1104 coated with a second, high temperature catalyst. As described above, the first substrate 1102 and the second substrate 1104 may be metallic (e.g., stainless steel, or the like) or ceramic substrates, for example, with a monolithic honeycomb structure. In some examples, the first substrate 1102 and the second substrate 1104 may be made of the same material. In other examples, the first substrate 1102 and the second substrate 1104 may be made of different materials.

The first substrate 1102 may be coated with a low temperature catalyst. As an example, the low temperature catalyst may be platinum. The low temperature catalyst may facilitate a chemical reaction under a low temperature range, such as between 300° C. and 500° C. As such, the low temperature catalyst may operate during low load or idle conditions when an exhaust temperature is relatively low. In one embodiment, the low temperature catalyst may facilitate conversion of CO and hydrocarbons to water and $CO_2$. The low temperature catalyst may further be a nitrogen oxide-based catalyst which facilitates conversion of NO to $NO_2$.

The second substrate 1104 may be coated with a high temperature catalyst. As an example, the high temperature catalyst may be a mixture of platinum and palladium. In one example, the high temperature catalyst may be made of four parts platinum and one part palladium by weight. The high temperature catalyst may facilitate a chemical reaction under a high temperature range, such as between 500° C. and 600° C. As such, the high temperature catalyst may operate during conditions when an exhaust temperature is relatively high, as described above. For example, conditions in which the exhaust gas temperature is relatively high may include tunneling operation, active regeneration of the particulate filter, and/or conditions in which degradation of a component such as a turbocharger has occurred. In one embodiment, the high temperature catalyst may facilitate conversion of CO and hydrocarbons to water and $CO_2$. The high temperature catalyst may further be a nitrogen oxide-based catalyst which facilitates conversion of NO to $NO_2$.

As depicted in FIG. 11, the oxidation catalyst device 1100 further includes a flow control element 1106 operably coupled with the first substrate 1102 which may be controlled by a controller, such as the controller 148 described above with reference to FIG. 1, in order to actively direct the exhaust gas flow along a first flow path through the first substrate 1102 or along a second flow path through the second substrate 1104. In the example embodiment depicted in FIG. 11, the first substrate 1102 is disposed in a housing 1108, such as a pipe or other suitable conduit. The flow control element 1106 may be a valve, such as an on/off valve, a flow control valve, or a diverter valve. In other examples, the flow control element 1106 may be a flap that is capable of covering and blocking exhaust gas flow to the first substrate 1102. A position of the flow control element 1106 governs an extent to which exhaust gas flows through the first substrate. For example, when the flow control element is closed, exhaust gas may not pass through the first substrate 1102, and, instead, is directed along a second flow path through the second substrate 1104. On the other hand, when the exhaust gas valve is open, exhaust gas may flow through the first substrate 1102 and the second substrate 1104.

The housing 1108 may allow at least some heat transfer between the first substrate 1102 and the second substrate 1104. As such, even when the flow control element 1106 is closed so that high temperature exhaust gas does not flow through the first substrate 1102, a temperature of the first substrate 1102 may be maintained above an activation temperature. In this manner, when the flow control element 1106 is opened, the temperature of the first substrate 1102 is greater than the activation temperature such that the low temperature catalyst coated on the first substrate 1102 may resume conversion of NO to $NO_2$ with little to no delay.

In some embodiments, the first substrate 1102 and the second substrate 1104 may have different cell densities, as described above with reference to FIG. 8. As an example, the first substrate 1102 coated with the low temperature catalyst may have a higher cell density than the second substrate 1104 coated with the high temperature catalyst. As the higher cell density may be more restrictive to a higher temperature exhaust gas (FIG. 10), the higher temperature exhaust gas may be more likely to flow along the second flow path through the second substrate 1104 with the lower cell density. When the flow control element is in an open position, the lower temperature exhaust gas may be more likely to flow along the first flow path through the first substrate 1102 with the higher cell density.

As depicted in FIG. 11, the first substrate 1102 coated with the low temperature catalyst is positioned in the center of the oxidation catalyst device 1100 and the second substrate 1104 coated with the high temperature catalyst surrounds the circumference of the first substrate 1102. In other embodiments, the second substrate 1104 coated with the high temperature catalyst may be positioned in the center of the oxidation catalyst and the first substrate 1102 coated with the low temperature catalyst may surround the circumference of the second substrate 1104. In such a configuration, the flow control element 1106 may control the flow of exhaust gas through the second substrate 1104.

FIG. 12 shows an exemplary embodiment of an exhaust gas treatment device 1200 disposed in an exhaust passage 1202. The exhaust gas treatment device 1200 includes the oxidation catalyst device 1100 described above with reference to FIG. 11. As depicted, the exhaust gas treatment device 1200 further includes a particulate filter 1204, such as a DPF or other particulate matter filter, disposed downstream of the first substrate 1102 and the second substrate 1104 of the oxidation catalyst device 1100. The particulate filter 1204 may include a substrate such as a ceramic (e.g., cordierite) or silicon carbide substrate, for example, with a monolithic honeycomb structure. In some examples, such as described above with reference to FIGS. 4 and 6, the particulate filter 1204 may be a catalyzed particulate filter coated with a catalyst. As an example, the particulate filter 1204 may be coated with a catalyst such as an oxidized ceramic material and/or a mineral, as described above. In some embodiments, the diesel particulate filter may be a wall flow particulate filter. In other embodiments, the diesel particulate filter may be a flow through particulate filter.

The exhaust gas treatment device 1200 further includes a flow control element 1106 operably coupled to the first substrate 1102 via a housing 1108. By adjusting the flow control element 1106 to direct the flow of exhaust gas through the first substrate 1102 or the second substrate 1104, an oxidizer may be generated by the low temperature catalyst and/or high temperature catalyst during a range of exhaust gas temperatures (e.g., 300-600° C.), including low and high exhaust gas temperatures. With the particulate filter 1204 positioned downstream of the oxidation catalyst device 1100, the oxidizers generated by the low and high temperature catalysts may flow to the particulate filter 1204, and passive regeneration of the particulate filter 1204 may be carried out over a range of exhaust gas temperatures without degrading the low temperature catalyst.

In one embodiment, a method for an exhaust gas treatment device, such as the exhaust gas treatment device 900 described above with reference to FIG. 9 or the exhaust gas treatment device 1200 described above with reference to FIG. 12, comprises the step of determining a temperature of exhaust gas flowing through the exhaust passage. The method further comprises, when the temperature of the exhaust gas is less than a threshold temperature, selectively directing the exhaust gas along a first flow path through a first substrate coated with a low temperature catalyst which converts nitric oxide to nitrogen dioxide, and when the temperature of the exhaust gas is greater than the threshold temperature, selectively directing the exhaust gas along a second flow path through a second substrate coated with a high temperature catalyst which converts nitric oxide to nitrogen dioxide, the second substrate positioned coaxially with the first substrate within the exhaust gas treatment device. The method further comprises oxidizing particulate matter with the nitrogen dioxide in a particulate filter disposed downstream of the first substrate and the second substrate.

Figure 13:
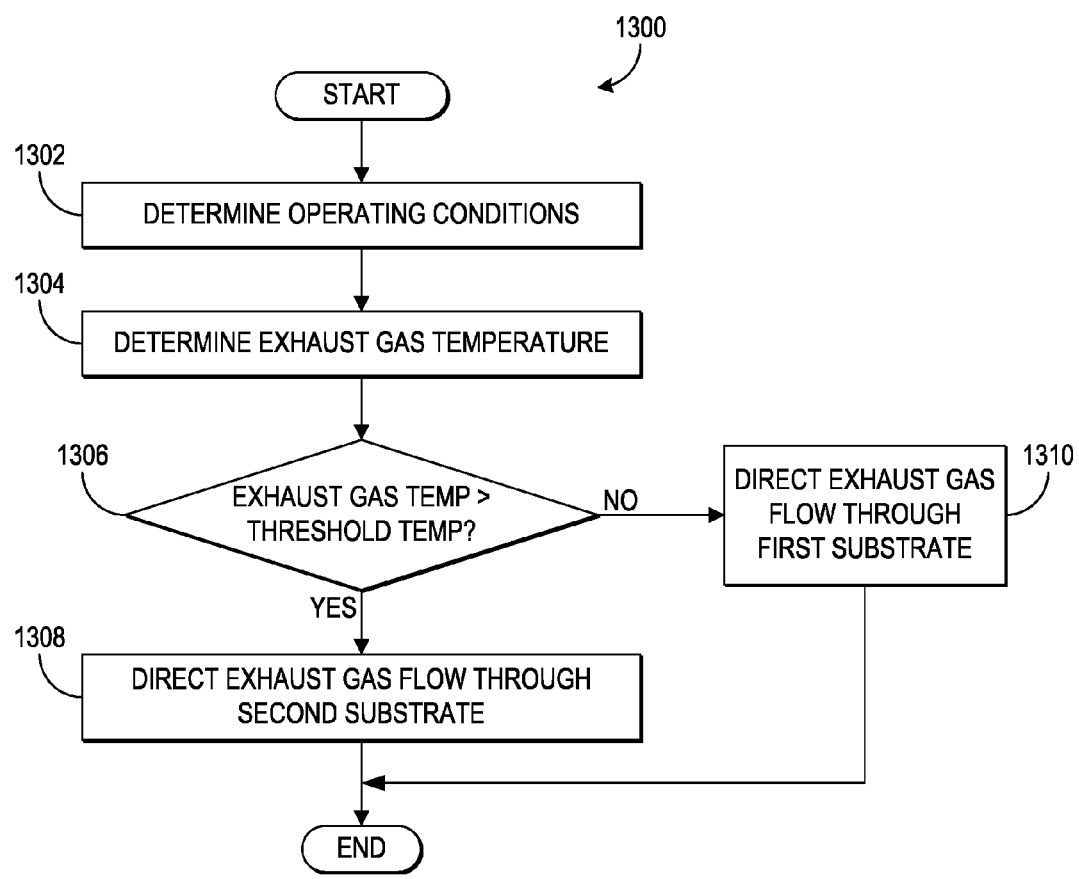
FIG. 13 shows a flow chart illustrating a method for use of an exhaust treatment device according to an embodiment of the invention.

FIG. 13 shows a flow chart illustrating a method 1300 for an exhaust gas treatment device, such as the exhaust gas treatment device 900 described above with reference to FIG. 9 or the exhaust gas treatment device 1200 described above with reference to FIG. 12. Specifically, the method determines the temperature of exhaust gas flowing through the exhaust passage and directs the flow of the exhaust gas through a first and/or second substrate of an oxidation catalyst disposed in the exhaust gas treatment device accordingly.

At 1302, operating conditions are determined As non-limiting examples, the operating conditions may include engine load conditions, environmental conditions (e.g., tunneling operation, ambient temperature, ambient pressure, and the like), exhaust conditions (e.g., temperature, pressure, and the like), and the like.

At 1304, the exhaust gas temperature is determined. The exhaust gas temperature may be determined based on temperature sensor measurements from temperature sensors in the exhaust passage, for example. In some examples, the method does not require determination of the specific temperature, but determination if the temperature is above or below a threshold temperature.

Once the exhaust temperature is determined, it is determined if the exhaust gas temperature is greater than a threshold temperature at 1306. The threshold temperature may be based on the composition of the catalysts in the exhaust gas treatment device. In one example, the threshold temperature may be 500° C. In other examples, the threshold temperature may be greater than 500° C. or less than 500° C.

If it is determined that the exhaust gas temperature is greater than the threshold temperature, the method continues to 1308 where the exhaust gas flow is selectively directed along a second flow path through the second substrate coated with the high temperature catalyst. In some examples, such as in the exhaust gas treatment device depicted in FIG. 9, the exhaust gas flow may be passively directed through the second substrate based on a cell density of the substrate, as described above. For example, the second substrate coated with the high temperature catalyst may have a lower cell density than the first substrate coated with the low temperature catalyst. The higher temperature exhaust gas, which has a higher flow rate than lower temperature exhaust gas, may favor the lower cell density substrate, and as such, the high temperature exhaust flow may flow through the second substrate coated with the high temperature catalyst. In this manner, flow of high temperature exhaust gas through the first substrate coated with the low temperature catalyst may be reduced and degradation of the low temperature catalyst may be reduced.

In other examples, such as in the exhaust gas treatment device depicted in FIG. 12, the exhaust gas flow may be actively directed through the second substrate based on actuation of a flow control element, such as the flow control element 1106 described above with reference to FIGS. 11 and 12, as described above. For example, the flow control element may be closed once it is determined that the exhaust gas temperature is greater than the threshold temperature. In this manner, exhaust gas flow through the first substrate coated with the low temperature catalyst may be substantially reduced or cut-off, thereby reducing degradation of the low temperature catalyst.

On the other hand, if it is determined that the exhaust gas temperature is less than the threshold temperature at 1306, the method moves to 1310 where the exhaust gas flow is directed through the first substrate coated with the low temperature catalyst. In some examples, the exhaust flow may be directed through the first substrate based on a cell density of the substrate. As described above, the first substrate coated with the low temperature catalyst may have a higher cell density than the second substrate coated with the high temperature catalyst. The lower temperature gas, which has a lower flow rate than the high temperature gas, may favor the higher cell density substrate, and as such, the low temperature exhaust flow may flow through the first substrate coated with the low temperature catalyst.

Thus, exhaust gas flow through an oxidation catalyst including a first substrate coated with a low temperature catalyst and a second substrate coated with a high temperature catalyst may be controlled based on a temperature of the exhaust gas. By controlling the flow of exhaust gas through the substrates, while not thermally isolating the substrates from the heat source, a temperature of the substrates and corresponding catalysts may be maintained above an activation temperature such that oxidizer formation may be resumed quickly when exhaust gas flow through the substrate is resumed.

The exhaust gas treatment devices (e.g., exhaust gas treatment devices 130, 209, 401, 600, 900, and/or 1200) shown in FIGS. 1-2, 4, 6, 9, and 12 may all be supported and suspended above the engine of the engine system (e.g., engine 104 shown in FIG. 1 or engine 203 shown in FIG. 2) by a support structure. An example embodiment of such a support structure is shown in FIGS. 14-21.

Turning first to FIG. 14, an engine system 101 including an engine 104 is shown (e.g., may be the same as engine system 101 and engine 104 shown in FIG. 1). As described above with reference to FIG. 1, the engine 104 receives intake air for combustion from the intake passage 114. The intake may be any suitable conduit or conduits through which gases flow to enter the engine. For example, the intake may include an intake manifold 115, the intake passage 114, and the like. The intake passage 114 receives ambient air from an air filter (not shown) that filters air from outside of the engine 104. Exhaust gas resulting from combustion in the engine 104 is supplied to an exhaust, such as exhaust passage 116. The exhaust, or exhaust passage 116, may be any suitable conduit through which gases flow from the engine. For example, the exhaust may include an exhaust manifold 117, an exhaust passage 116, and the like. Exhaust gas flows through the exhaust passage 116 and out of the engine system 101.

As shown in FIG. 14, engine 104 is a Vee engine (e.g., V-engine) having a first bank of cylinders and a second bank of cylinders (similar to V-engine 203 shown in FIG. 2). In the embodiment depicted in FIG. 14, the engine 104 is a V-12 engine having twelve cylinders. In other examples, the engine may be a V-6, V-8, V-10, or V-16 or any suitable V-engine configuration. The engine 104 includes an engine block and an engine head. The engine head includes a plurality of cylinder heads, each cylinder head 106 including a respective cylinder. Specifically, FIG. 1 shows six individual cylinder heads 106 for a first bank of the engine 104. The other six individual cylinder heads of the second bank are hidden in FIG. 14, as they are positioned behind the six cylinder heads of the first bank.

Each cylinder head 106 includes a valve cover 108. Additionally, each cylinder head 106 includes a fuel injector. Each fuel injector passes through a respective valve cover 108 and connects to a high pressure fuel line 110. The high pressure fuel line 110 runs along a length of the engine 104. Each cylinder head 106 is further coupled to the exhaust manifold 117. As such, exhaust gases produced during combustion exit the cylinder heads 106 through the exhaust manifold 117 and then flow to the exhaust passage 116. The exhaust passage 116 contains additional engine system components, including a turbine of a turbocharger 120 and an exhaust gas treatment device 130, as described further below.

The engine system 101 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

The engine system 101 further includes an exhaust gas treatment device 130 (may also be referred to herein as an exhaust gas aftertreatment system) coupled in the exhaust passage 116 in order to reduce regulated emissions. As depicted in FIG. 14, the exhaust gas treatment device 130 is disposed downstream of the turbocharger 120. In other embodiments, as shown in FIGS. 1-2, an exhaust gas treatment device may be additionally or alternatively disposed upstream of the turbocharger 120. The exhaust gas treatment device 130 may include one or more components, as discussed above with reference to FIGS. 1-13. For example, the exhaust gas treatment device 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

As one example, the exhaust gas treatment device 130 may be an SCR system including one or more SCR catalysts. In another example, the exhaust gas treatment device 130 may be a non-SCR system not including an SCR catalyst. For example, the non-SCR system may include one or more of a DPF and a DOC.

Further, as shown in FIG. 1, the exhaust gas treatment device 130 is positioned vertically above the engine 104, with respect to a surface on which the engine 104 sits. The exhaust gas treatment device 130 sits on and is supported by a support structure 140. The support structure 140 is directly mounted to the engine head. Specifically, the support structure 140 includes a plurality of support legs 142. Each support leg 142 is mounted to a respective cylinder head 106. The support structure 140 also includes a plurality of platforms 144 (only one shown in FIG. 1) coupled to the support legs 142 on each cylinder bank. Further, the support structure 140 includes coil isolators 146 coupled between each platform 144 and a surface of the exhaust gas treatment device 130. As described further below, the coil isolators 146 may isolate the exhaust gas treatment device 130 from vibration generated and transmitted by the engine 104. Further details of the support structure 140 are described below with regard to FIGS. 15-21.

In one embodiment, the engine system 101 may include an engine cab, such as the engine cab 301 shown in FIG. 3, as described above. In this embodiment, the exhaust gas treatment device 130 may be disposed between a top of the engine 104 and a ceiling (e.g., roof assembly 303 shown in FIG. 3) of the engine cab. As such, the support structure 140 may suspend the exhaust gas treatment device 130 above the engine 104 and below the ceiling of the engine cab.

The support structure introduced in FIG. 14 and described further below has several advantages over previous exhaust gas treatment device support structures. Firstly, the support structure 140 shown in FIG. 14 supports the exhaust gas treatment device through platforms. Thus, the exhaust gas treatment device of FIG. 14 is mounted to the platforms of the support structure instead of mounted to a wall of an engine cab. Secondly, the support structure 140 is mounted to the engine head instead of the engine block. Supporting the exhaust gas treatment device with platforms of a support structure mounted to an engine head increases stability of the support structure and exhaust gas treatment device. Mounting the exhaust gas treatment device to the engine head, through the platforms, may reduce translation of vibrations from the vehicle in which the engine is installed to the exhaust gas treatment device. Additionally, mounting the support structure directly to the engine head may allow for an increased number of mounting points, thereby reducing a size of each mounting fixture (e.g., support leg) and increasing the stability of the support structure.

Figure 15:
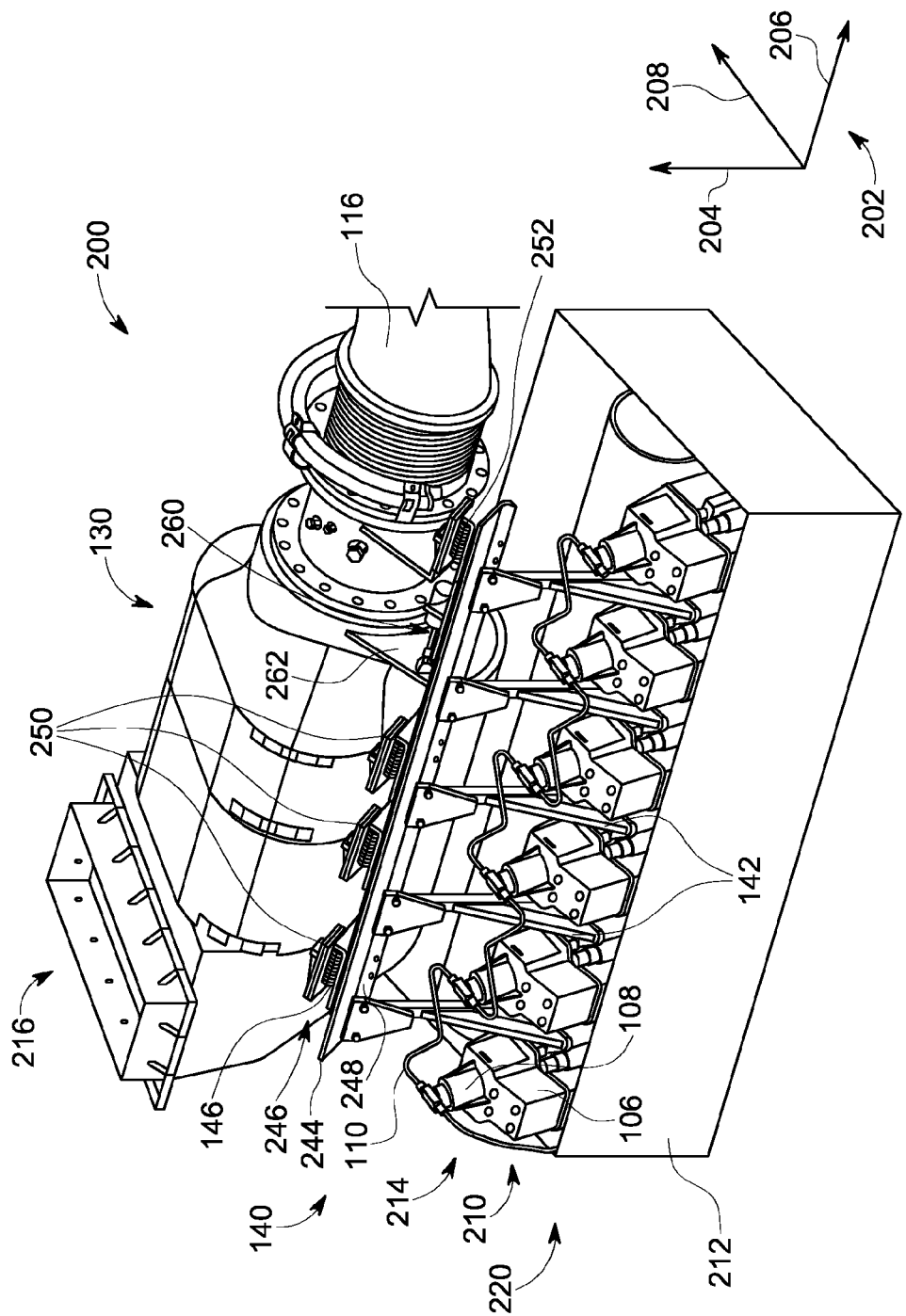
FIGS. 15-16 show a support structure of an exhaust gas treatment device in an engine system according to an embodiment of the invention.
Figure 16:
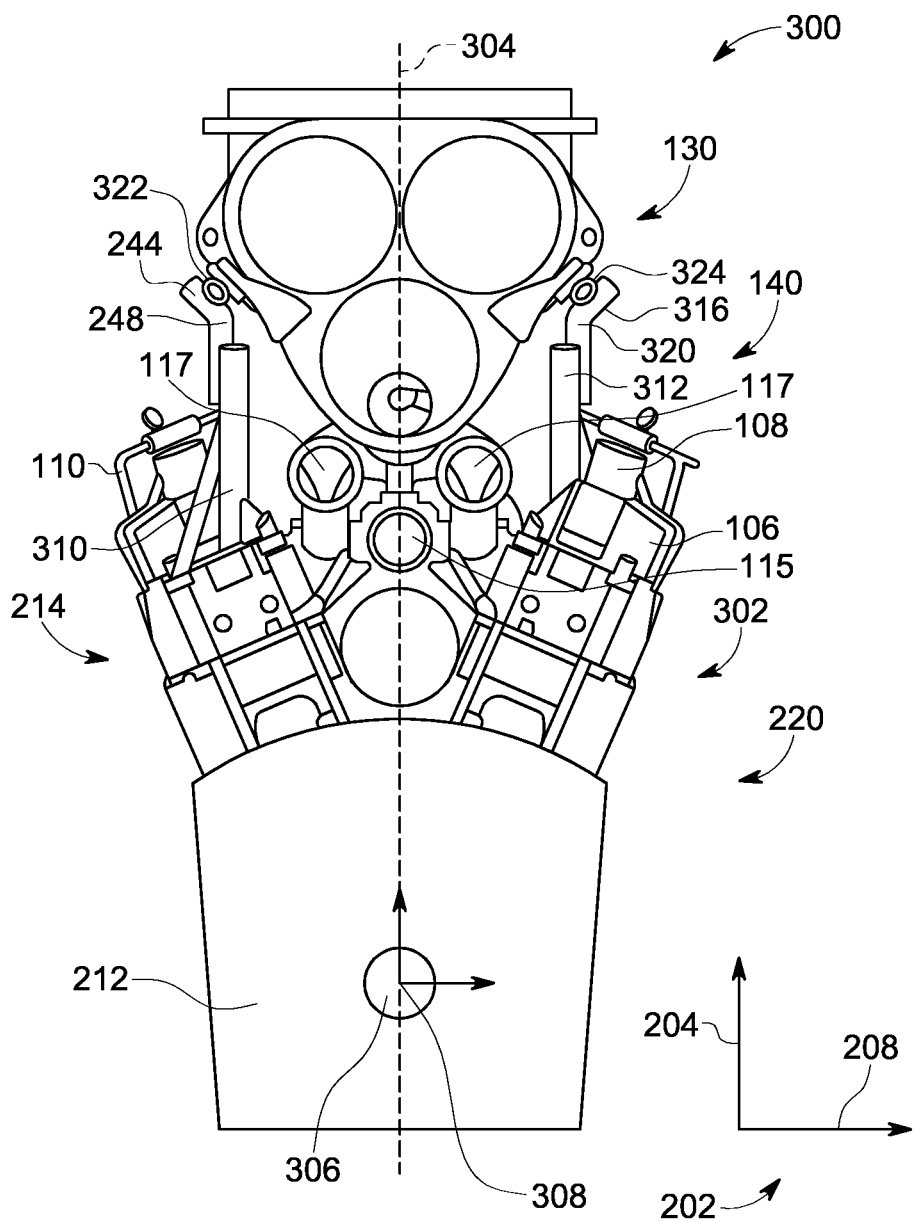
Figure 17:
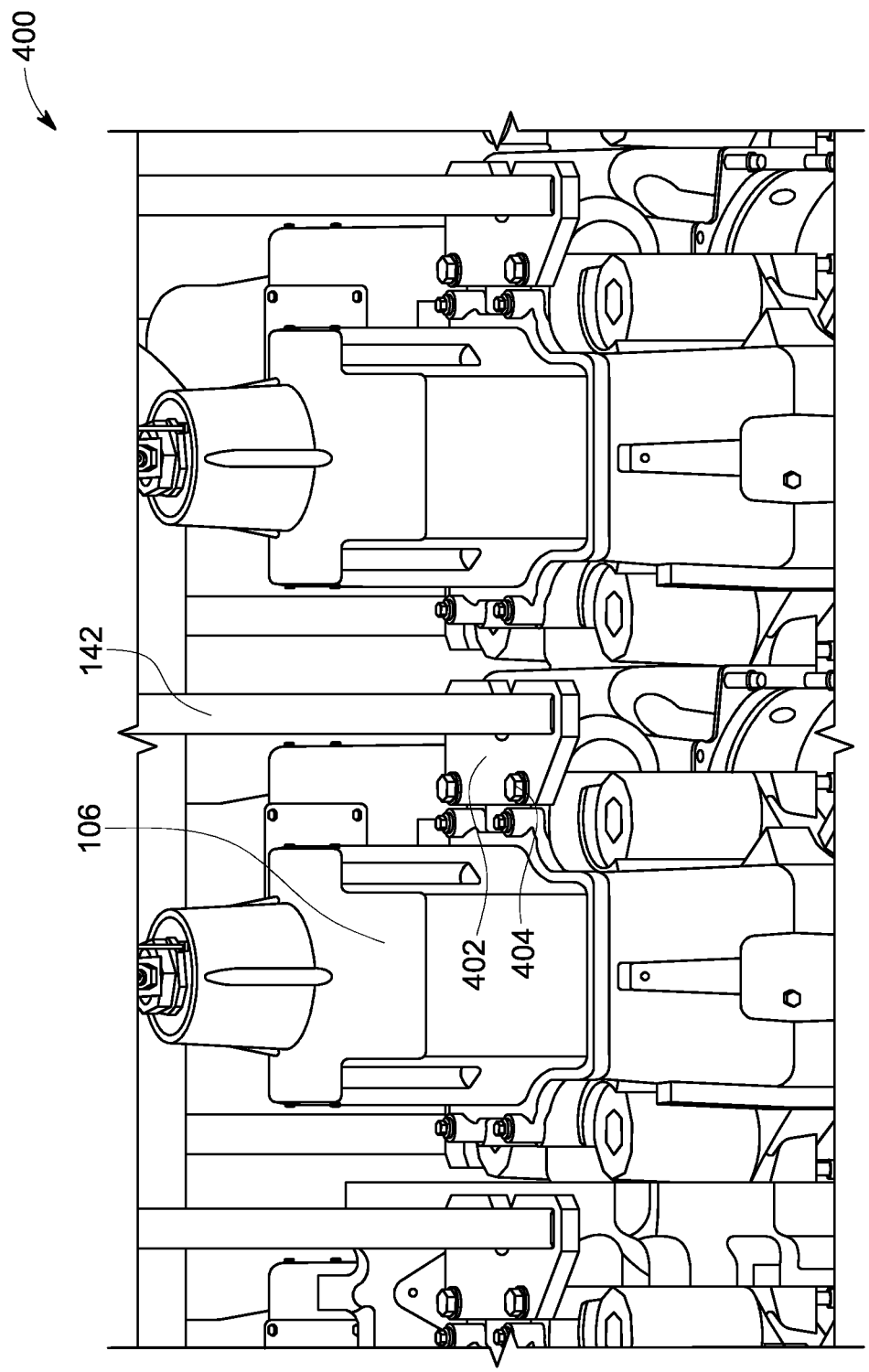
FIGS. 17-18 show a mounting interface between an exhaust gas treatment device support structure and an engine head according to an embodiment of the invention.
Figure 18:
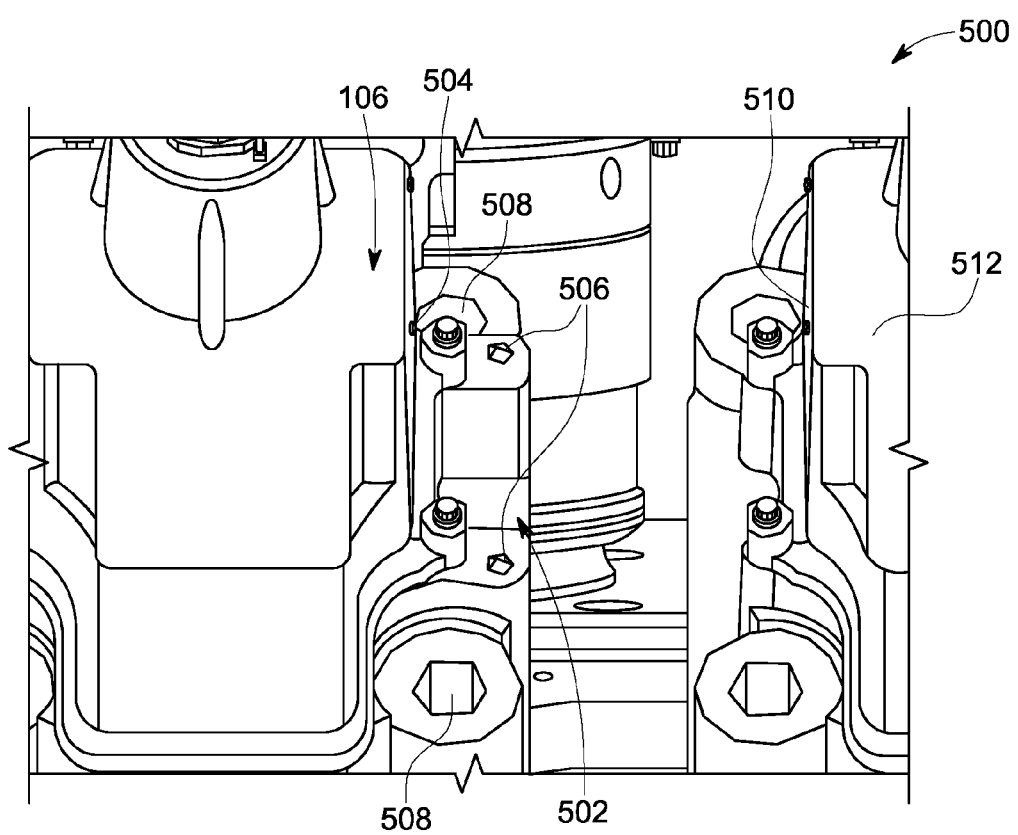
Figure 19:
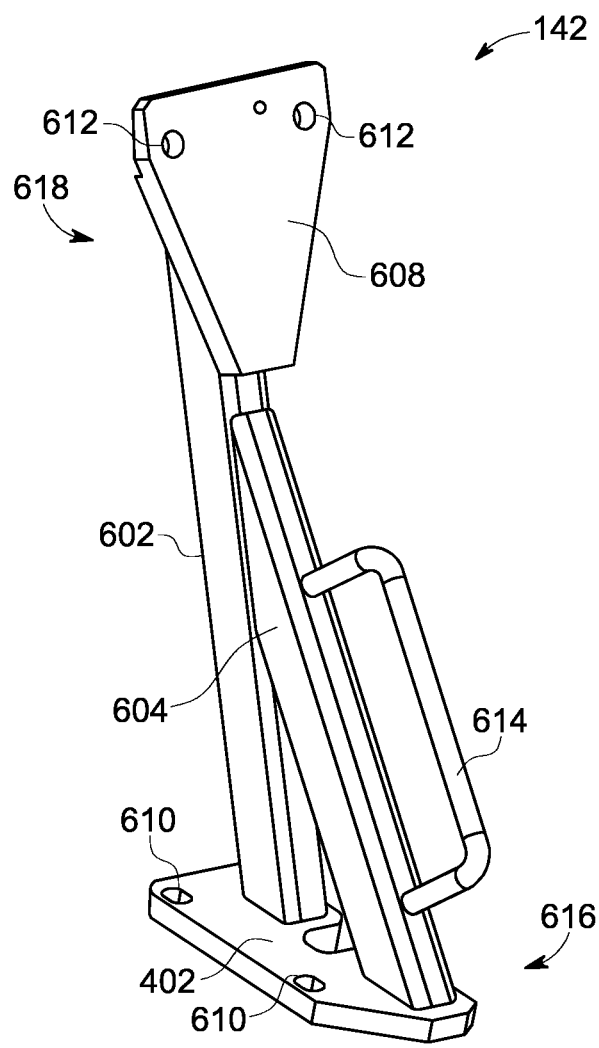
FIG. 19 shows a support leg of a support structure for an exhaust gas treatment device according to an embodiment of the invention.
Figure 20:
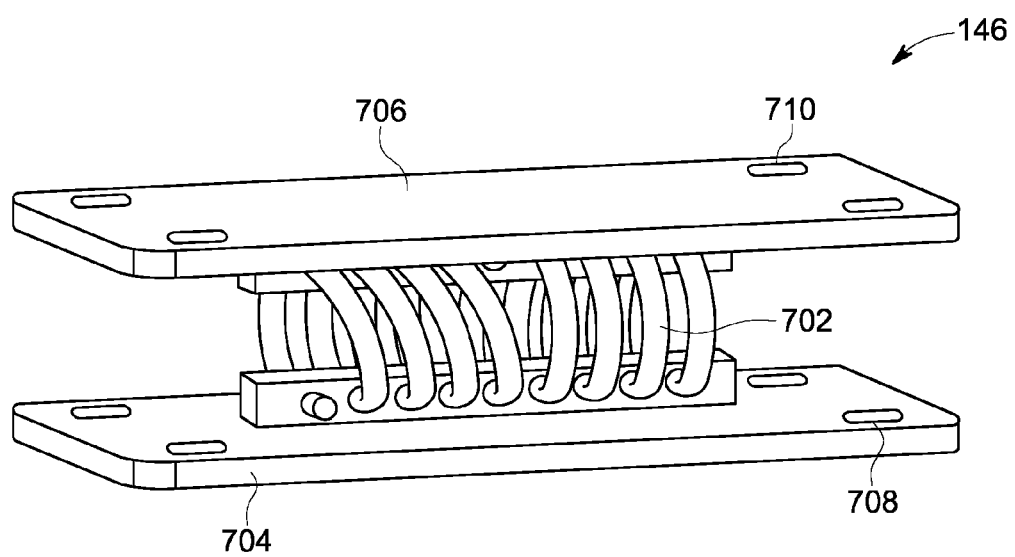
FIG. 20 shows a coil isolator of a support structure for an exhaust gas treatment device according to an embodiment of the invention.
Figure 21:
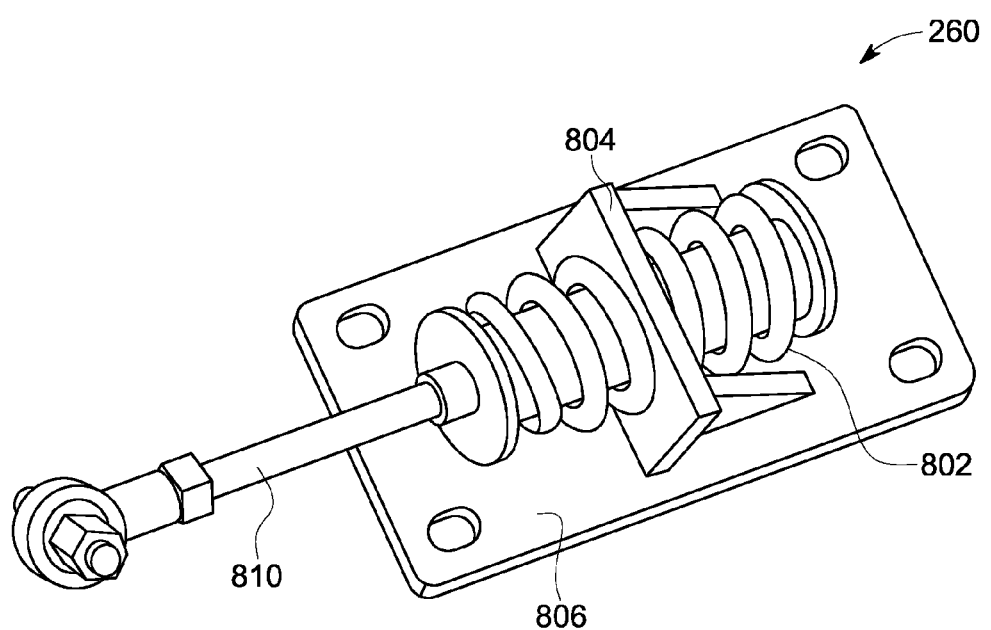
FIG. 21 shows a spring coil isolator of a support structure for an exhaust gas treatment device according to an embodiment of the invention.

FIGS. 15-21 show a support structure 140 and its components. Specifically, FIGS. 15-16 show the support structure 140 installed in an engine system, such as the engine system 101 of FIG. 14. The engine system of FIGS. 15-16 may include like components to those described above with regard to FIG. 1, FIG. 2, and/or FIG. 14. FIGS. 17-18 are detailed views of a mounting interface between the support structure 140 and an engine head. FIG. 19 shows a support leg of the support structure 140, FIG. 20 shows a coil isolator of the support structure 140, and FIG. 21 shows a spring coil isolator of the support structure 140.

Turning to FIGS. 15-16, a coordinate axis system 202 is depicted showing different directions in the engine system. In the example of FIGS. 15-16, the longitudinal direction is indicated by 206 (e.g., longitudinal axis), the vertical direction is indicated by 204 (e.g., vertical axis), and the lateral direction is indicated by 208 (e.g., lateral axis). FIG. 15 shows a schematic 200 of an isometric view of the support structure 140 in the engine system. FIG. 16 shows a schematic 300 of a cross-section view, in the vertical-lateral plane, of the support structure 140 in the engine system.

As shown in FIGS. 15-16, the support structure 140 is coupled to an engine head 210, the engine head 210 positioned on an engine block 212, of a V-engine 220 (such as engine 104 shown in FIG. 1 and/or FIG. 14). The engine head 210 includes a plurality of cylinder heads 106. Each cylinder head 106 includes an individual cylinder of the engine. As described above, the V-engine 220 includes a plurality of cylinder heads 106 aligned in two separate planes or banks, so that they appear to be in a "V" when viewed along the horizontal axis 206 (e.g., into the page in FIG. 16).

As shown in FIG. 15, the engine head 210 includes six cylinder heads 106 on a first bank 214 of the engine. The engine head 210 also includes six cylinder heads 106 on a second bank 302 of the V-engine 220 (hidden in FIG. 1). As shown in FIG. 16, the first bank 214 and the second bank 302 are opposite one another with respect to a vertical centerline 304 of the engine. The first bank 214 is to the left of the centerline 304 and the second bank 302 is to the right of the centerline 304. Thus, the first bank 214 may be referred to as the left bank and the second bank 302 may be referred to as the right bank. A crankshaft 306 of the V-engine 220 has an axis of rotation 308 in the direction of the horizontal axis 206 (e.g., into the page in FIG. 3). Further, the axis of rotation 308 of the crankshaft 306 is centered laterally at the centerline 304.

Each of the cylinder heads 106 are individually mounted to the engine block 212. As such, each cylinder head 106 is individually removable from the engine block 212. Additionally, as described above with regard to FIG. 14, each cylinder head 106 includes a valve cover 108. A high pressure fuel line 110 connects to a fuel injector of each cylinder head 106, the fuel injectors running through respective valve covers 108.

FIG. 16 also shows an intake manifold 115 and exhaust manifolds 117 of the V-engine 220. Intake air for combustion flows through the intake manifold 115 and enters each of the cylinder heads 106. Exhaust gases resulting from combustion exit the cylinder heads 106 and enter one of two exhaust manifolds. As shown in FIG. 16, the engine system includes one exhaust manifold for the first bank 214 of cylinders and one exhaust manifold for the second bank 302 of cylinders. Exhaust gases travel through the exhaust manifolds 117 and into an exhaust passage 116 (partially shown in FIG. 15). The exhaust passage 116 is coupled to the exhaust gas treatment device 130. Exhaust gases flow through the exhaust gas treatment device 130 and then exit the engine system through an exhaust stack 216 (shown in FIG. 15).

As introduced above in FIG. 14, the support structure 140 includes a plurality of support legs 142, a plurality of platforms (such as the platform 144 shown in FIG. 1), a plurality of coil isolators 146, and a plurality of rails. The support structure 140 may be divided into two sets of components, a first set on the first bank 214 of the engine and a second set on the second bank 302 of the engine. The first set of components on the first bank 214 is shown in FIG. 15. As seen in FIG. 16, the centerline 304 of the V-engine 220 is also a centerline of the support structure 140. As such, the support structure is symmetric with respect to the centerline 304.

For example, the plurality of platforms includes a first platform 244 and a second platform 316. As shown in FIG. 16, the first platform 244 and the second platform 316 are on opposite sides of the centerline 304 from one another, with the first platform 244 to the left of the centerline (e.g., proximate to the first bank 214) and the second platform 316 to the right of the centerline (e.g., proximate to the second bank 302). The first platform 244 and the second platform 316 are angled at 45 degrees away from the centerline 304. Specifically, the degree of angling of the platforms forms an acute angle of 45 degrees, defined between the centerline 304 and a side of the platform facing the exhaust gas treatment device 130. The degree of angling of the platforms also forms an obtuse angle of 135 degrees between the centerline 304 and a side of the platform facing the cylinder heads 106.

In alternate embodiments, the degree of angling (e.g., the acute angle) may be within a range of 0 to 90 degrees. For example, the range of angling of the platforms may be from 35 to 60 degrees. In one example, the degree of angling may be 60 degrees such that the first platform 244 and the second platform 316 are angled at 60 degrees away from the centerline 304. In another example, the degree of angling may be 40 degrees. In yet another example, the degree of angling may be greater than 0 degrees and less than 90 degrees such that the platforms are not completely vertical and not completely lateral, with respect to the vertical axis 204 and the lateral axis 208, respectively. The degree of angling may be based on a shape and size of the exhaust gas treatment device 130. Further, the degree of angling may be defined such that the platforms support and cradle the exhaust gas treatment device 130, thereby reducing additional assembly tooling for mounting the exhaust gas treatment device 130 to the support structure 140.

The exhaust gas treatment device 130 is positioned vertically above the V-engine 220 with respect to the vertical axis 204 and a surface on which a vehicle or other powered system in which the V-engine 220 is installed sits (such as the ground). The angling of the first platform 244 and the second platform 316 supports the exhaust gas treatment device 130 both laterally and vertically, with regard to the lateral axis 208 and the vertical axis 204, respectively.

The plurality of coil isolators 146 includes a first set of coil isolators 246 and a second set of coil isolators. FIG. 16 shows a first coil isolator 322, the first coil isolator 322 included in the first set of coil isolators 246, coupled between the first platform 244 and a surface of a first side of the exhaust gas treatment device 130. The first side of the exhaust gas treatment device is on a first bank side of the V-engine 220, with respect to the centerline 304. Similarly, a second coil isolator 324, included in the second set of coil isolators, is coupled between the second platform 316 and a surface of a second side of the exhaust gas treatment device 130. The second side of the exhaust gas treatment device is on a second bank side of the V-engine 220, with respect to the centerline 304.

A rail is coupled to each platform. Specifically, as shown in FIG. 16, a first rail 248 is coupled to the first platform 244 and a second rail 320 is coupled to the second platform 316. Further, the first rail 248 and the second rail 320 are positioned parallel with a crankshaft of the engine. The first rail 248 and the second rail 320 are further coupled to the plurality of support legs 142.

The plurality of support legs 142 includes a first set of support legs on the first bank 214 and a second set of support legs on the second bank 302. FIG. 16 shows a first support leg 310 on the first bank 214, the first support leg 310 included in the first set of support legs, and a second support leg 312 on the second bank 302, the second support leg 312 included in the second set of support legs. As shown in FIG. 16, the first support leg 310 is coupled to the first rail 248 and the second support leg 312 is coupled to the second rail 320. The first support leg 310 is further coupled to a cylinder head 106 on the first bank 214 and the second support leg 312 is further coupled to a cylinder head 106 on the second bank 302. Further details on the mounting of the support structure 140 to the engine head 210 and the exhaust gas treatment device 130 are shown in FIG. 15.

Turning to FIG. 15, a first side of the support structure, on the first bank 214, is shown. Specifically, FIG. 15 shows five support legs 142 included in the first set of support legs. The second set of support legs (not shown in FIG. 2) also includes five support legs 142. In alternate embodiments, the support structure 140 may have more or less than ten total support legs. In one embodiment, the number of support legs is based on a number of cylinder heads. For example, in an embodiment wherein the V-engine 220 includes four cylinder heads 106 on each bank, the support structure 140 may include three support legs on each bank (e.g., six support legs in total). However, in other embodiments, the number of support legs may be based on other factors, such as a mass of the load placed on the support structure and/or a size of the support legs.

A first end of each support leg 142 in the first set of support legs is coupled to a respective cylinder head 106 on the first bank 214. Similarly, a first end of each support leg 142 in the second set of support legs is coupled to a respective cylinder head 106 on the second bank 302. Each support leg 142 is coupled to a side of a respective cylinder head 106 such that each support leg 142 is positioned between adjacent cylinder heads 106.

FIGS. 17-18 show a mounting interface between the support legs 142 and cylinder heads 106 in detail. FIG. 17 is a schematic 400 showing a first end of each support leg 142 mounted to the side of a respective cylinder head 106. FIG. 18 is a schematic 500 showing a mounting bracket 502 of the cylinder head 106. The mounting bracket 502 is coupled to a side 504 of the cylinder head 106. The mounting bracket 502 includes holes 506 configurable to receive fasteners for fastening the support leg 142 to the mounting bracket 502. Further, the mounting bracket 502 is positioned between holes 508. The holes 508 are holes configurable to receive fasteners, such as bolts, for fastening the cylinder head 106 to the engine block 212. As discussed above, each cylinder head 106 is individually mounted through the holes 508 to the engine block 212. The mounting bracket 502 is positioned proximate to an opposite side 510 of an adjacent cylinder head 512. Additionally, as shown in FIG. 17, each support leg 142 is mounted on the same side (e.g., side 504 shown in FIG. 18) of each cylinder head 106. As such, each mounting bracket is coupled to the same side of each cylinder head 106.

As shown in FIG. 17, a base 402 of the support leg 142 is coupled to the mounting bracket. Bolts 404, or another type of fastener, fix the base 402 to the mounting bracket 502 at the holes 506 (shown in FIG. 18). As shown in FIGS. 17-18, the mounting bracket 502 includes two holes 506, or fastening points, for mounting the support leg 142 to the cylinder head 106. In alternate embodiments, the mounting bracket 502 may include more or less than two fastening points. For example, the mounting bracket 502 may include only one hole 506 and only one bolt 404 may fix the base 402 to the mounting bracket 502. In another example, the mounting bracket may include three or more holes 506 and three or more bolts 404 may fix the base 402 of the support leg 142 to the mounting bracket 502. The support leg 142 is shown in more detail at FIG. 19.

FIG. 19 shows an isometric view of a single support leg 142 of the support structure 140. The support leg 142 includes a first end 616 and a second end 618. As described above, the first end 616 of the support leg 142 is coupled to a respective cylinder head. As described further below, the second end 618 of the support leg 142 is coupled to a rail of the support structure 140, the rail coupled to a platform.

The support leg 142 includes a first segment 602 and a second segment 604. The first segment 602 is coupled to the base 402 and a mounting face 608. The base 402 is configurable to mount to a mounting surface. Specifically, the base 402 is flat and includes holes 610 for fastening or mounting the support leg 142 to a mounting surface. In the embodiments shown in FIGS. 15-18, the mounting surface is a mounting bracket of a cylinder head 106. As described above with regard to FIGS. 17-18, the base 402 is coupled to the mounting bracket 502 on the side of the cylinder head 106. Specifically, the bolts 404 pass through the holes 610 in the base 402 and the corresponding holes 506 in the mounting bracket 502 to fasten the base 402 to the mounting bracket 502. As described above, in alternate embodiments, the base 402 may include more or less holes 610 than two, as shown. In an embodiment, the number of holes 610 is equal to the number of holes 506. Further, the mounting face 608 of the support leg 142 is flat with a triangular shape. The mounting face 608 includes holes 612 for fastening or mounting the support leg 142 to one of the first rail 248 or the second rail 320.

The second segment 604 is coupled to the base 402 and the first segment 602. Specifically, a first end of the second segment 604 is coupled to the first segment 602 at a middle portion of the first segment 602 (e.g., between the base 402 and the mounting face 608). A second end of the second segment 604 is coupled to the base 402. Further, a handle 614 is coupled to the second segment 604. The handle 614 may facilitate removal of the individual support leg 142 from its corresponding cylinder head 106 and from the rest of the support structure 140. In an alternate embodiment, the support leg 142 may not include a handle 614. In this case, the support leg 142 may still be individually removable from the support structure 140 and its respective cylinder head 106.

Returning to FIG. 15, a second end of each support leg 142 is coupled to a rail. For example, as shown in FIG. 2, a second end of each support leg 142 of the first set of support legs is coupled to the first rail 248. The first rail 248 is coupled to a first side of the first platform 244. The first side of the first platform 244 is a downward-facing side which faces the engine head 210. Further, a first side of each coil isolator 146 in the first set of coil isolators 246 is coupled to a second side of the first platform 244. The second side of the first platform 244 is an upward-facing side which faces the exhaust gas treatment device 130. A second side of each coil isolator 146 in the first set of coil isolators 246 is coupled to a surface of the exhaust gas treatment device 130.

As shown in FIG. 15, the first platform 244 on the first bank 214 extends along a length of the engine block 212.

Similarly, the second platform 316 on the second bank 302 (not shown in FIG. 15) also extends along the length of the engine block 212. A length of the first platform 244 and the second platform 316 is shorter than the length of the engine block 212. In alternate examples, the length of the first platform 244 and the second platform 316 may be the same length as the engine block 212.

Further, FIG. 15 shows four coil isolators 146 included in the first set of coil isolators 246. The second set of coil isolators (not shown in FIG. 15) also includes four coil isolators 146 on the opposite side of the V-engine 220 (e.g., second side proximate to the second bank 302). The second set of coil isolators may be positioned similarly on the second platform 316 as the first set of coil isolators 246 on the first platform 244, as described below.

Each coil isolator 146 is positioned a distance away from an adjacent coil isolator 146, along a length of the first platform 244. The distance between adjacent coil isolators 146 is not the same for all the coil isolators 146. For example, as shown in FIG. 15, three coil isolators 250 of the first set of coil isolators 246 are coupled to a main body of the exhaust gas treatment device 130. A fourth coil isolator 252 of the first set of coil isolators 246 is coupled to the exhaust gas treatment device 130 at a junction between the exhaust gas treatment device 130 and the exhaust passage 116. As such, the three coil isolators 250 are positioned along the first platform 244, closer to the exhaust stack 216 than the fourth coil isolator 252. Similarly, the fourth coil isolator 252 is positioned along the first platform 244, closer to the exhaust passage 116 than the three coil isolators 250.

In alternate embodiments, the support structure 140 may have more or less than eight total coil isolators 146. The number of coil isolators may be based on a size and/or length of the exhaust gas treatment device 130. For example, an exhaust gas treatment device 130 with a longer length may include more coil isolators 146 on each side of the exhaust gas treatment device than an exhaust gas treatment device with a shorter length. Further, the number of coil isolators 146 may be based on the degree of angling of the first platform 244 and the second platform 316. For example, angling the first platform 244 and the second platform 316 at 45 degrees allows the coil isolators 146 to be effective in both the vertical plane (defined with respect to the vertical axis 204) and the lateral plane (defined with respect to the lateral axis 208. Thus, the number of coil isolators 146 may be fewer when the platforms are angled at 45 degrees than if the platforms were angled at an angle greater or less than 45 degrees. In an alternate example, because the coil isolators may have different vertical and lateral stiffness, the angle allowing for the fewest coil isolators may be less than 45 degrees.

FIG. 20 shows a single coil isolator 146 in further detail. The coil isolator 146 includes an elastic coil 702 positioned between a first plate 704 and a second plate 706. The first plate 704 is mounted to one of the first platform 244 or the second platform 316. For example, fasteners may pass through holes 708 on the first plate 704 to fix the first plate 704 of the coil isolator 146 to one of the first platform 244 or the second platform 316. The second plate 706 is configured to receive a load. In the embodiments shown in FIGS. 15-16, the load is the exhaust gas treatment device 130. In this embodiment, fasteners may pass through holes 710 on the second plate 706 to mount the second plate 706 to the surface of the exhaust gas treatment device 130.

The coil isolator 146 may dampen vibrations transmitted by the V-engine 220. For example, if the V-engine 220 is installed in a vehicle, the coil isolator 146 may resist and dampen lateral and vertical movement of the vehicle. The lateral and vertical movements are defined with respect to the lateral axis 208 and the vertical axis 204, respectively. During engine and/or vehicle operation, the elastic coil 702 may compress and/or stretch to reduce the translation of vibrations from the first plate 704 to the second plate 706. In this way, the coil isolators 146 may isolate the exhaust gas treatment device 130 from movement and vibration translated through the engine block 212.

Returning to FIG. 15, the support structure 140 further includes a spring coil isolator on each side of the support structure 140. The spring coil isolator is a type of coil isolator. As such, the coil isolators 146 described above may be referred to as coiled coil isolators which have a different structure than the spring coil isolators shown in FIG. 21.

As shown in FIG. 15, a first spring coil isolator 260 is positioned on the first platform 244 between the three coil isolators 250 and the fourth coil isolator 252. FIG. 21 shows a single spring coil isolator 260 in further detail. The spring coil isolator 260 includes a spring 802 mounted in a spring bracket 804. The spring bracket 804 is coupled to a plate 806. Further, the spring 802 is coupled between the spring bracket 804 and an arm 810. The spring 802 may resist movement between the plate 806 and the arm 810.

As shown in FIG. 15, the plate 806 of the first spring coil isolator 260 is coupled to the first platform 244 and the arm 810 of the first spring coil isolator 260 is coupled to a protruding wall 262 of the exhaust gas treatment device 130. In this configuration, the spring coil isolator resists horizontal movement, defined with respect to the horizontal axis 206, translated by the V-engine 220. In this way, the spring coil isolator may dampen vibrations and/or movement in the horizontal direction, thereby isolating the exhaust gas treatment device 130 from the horizontal movement.

In an alternate embodiment, the support structure 140 may not include any spring coil isolators. In yet another embodiment, the support structure 140 may include more than one spring coil isolator on each side of the support structure 140. Additionally, in some embodiments, the spring coil isolator may be positioned at a different location along the first platform 244. For example, the protruding wall 262 may be positioned at a different location along the exhaust gas treatment device 130 (e.g., closer to the exhaust passage 116 or closer to the exhaust stack 216). As such, the position of the spring coil isolator may change along with the altered position of the protruding wall 262.

FIGS. 15-21 show a non-limiting embodiment of the support structure 140 for the exhaust gas treatment device 130 of the V-engine 220 (or V-engine 203 shown in FIG. 2). As described above, in alternate embodiments, the engine head 210 may include more or less than six cylinder heads 106 on each bank of the V-engine 220. As a result, the support structure 140 may include more or less than five support legs 142 on each side of the support structure 140, the sides of the support structure 140 corresponding to the sides or banks of the V-engine 220. Further, the support structure 140 may include any combination of isolators coupled to the platforms, the isolators including the coil isolators and the spring coil isolators. For example, the support structure 140 may include more or less than four coil isolators and/or more or less than one spring coil isolator on each side of the support structure 140.

In this way, a support structure for an exhaust gas treatment device of an engine system may be coupled directly to an engine head of a V-engine. Specifically, the support structure may include a plurality of support legs individually mounted to a respective cylinder head of the engine head.

Further, each cylinder head may be individually mounted to an engine block of the V-engine. The support structure may also include a rail coupled to support legs on each bank of the V-engine. Each rail may include a plurality of isolators which resist engine vibrations. The exhaust gas treatment device may be coupled to the coil isolators and supported vertically above the V-engine by the support structure. In this way, the exhaust gas treatment device may be supported along a length of the V-engine and isolated from engine vibrations. Further, individually mounting the support legs to respective cylinder heads creates a modular support structure and engine head, thereby allowing individual engine heads to be serviced without removing the entire support structure and exhaust gas treatment device from the engine.

As explained above, the terms "high temperature" and "low temperature" are relative, meaning that "high" temperature is a temperature higher than a "low" temperature. Conversely, a "low" temperature is a temperature lower than a "high" temperature. As used herein, the term "between," when referring to a range of values defined by two endpoints, such as between value "X" and value "Y," means that the range includes the stated endpoints.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences From the literal languages of the claims.

The invention claimed is:

1. A vehicle system, comprising:
   an engine with a longitudinal axis, where a crankshaft of the engine is parallel to the longitudinal axis, the engine including an engine block and a plurality of cylinder heads mounted to the engine block, each cylinder head of the plurality of cylinder heads being a single cylinder head separately mounted to the engine block;
   an exhaust gas treatment device mounted on the engine, vertically above the engine such that a longitudinal axis of the exhaust gas treatment device is aligned in parallel with the longitudinal axis of the engine, the exhaust gas treatment device configured to receive exhaust gas from an exhaust manifold of the engine; and
   further comprising a support structure configured to support the exhaust gas treatment device, the support structure including a plurality of support legs, a first end of each support leg of the plurality of support legs removably coupled to a respective cylinder head of the plurality of cylinder heads and positioned between adjacent cylinder heads.

2. The vehicle system of claim 1, wherein each support leg of the plurality of support legs includes a first segment and a second segment, wherein each support leg is coupled between the respective cylinder head and a rail of a platform against which the exhaust gas treatment device sits, and wherein each support leg is positioned between valve covers of adjacent cylinder heads.

3. The vehicle system of claim 1, wherein the engine is a V-engine having a first bank and a second bank, and wherein the support structure is centered along a centerline of the V-engine.

4. The vehicle system of claim 3, wherein the support structure includes a first platform and a second platform spaced away from one another and positioned on opposite sides of the centerline from one another, the first platform and the second platform extending along a length of the engine block.

5. The vehicle system of claim 4, wherein a first rail is coupled to a first side of the first platform and a second rail is coupled to a first side of the second platform, the first rail and the second rail positioned parallel with the crankshaft of the V-engine and wherein a second end of each support leg of the plurality of support legs is coupled to one of the first rail or the second rail.

6. The vehicle system of claim 4, wherein the first platform and the second platform are angled at 45 degrees away from the centerline and wherein the exhaust gas treatment device is positioned against the first platform and the second platform through a plurality of coil isolators.

7. The vehicle system of claim 6, wherein a first side of each coil isolator of the plurality of coil isolators is coupled to a second side of one of the first platform and the second platform and a second side of each coil isolator of the plurality of coil isolators is coupled to a surface of the exhaust gas treatment device and wherein the plurality of coil isolators are positioned a distance away from one another, a long a length of one of the first platform and the second platform.

8. The vehicle system of claim 1, wherein each support leg is individually mounted to and removable from a mounting bracket coupled to a side of the respective cylinder head and wherein a number of the plurality of support legs is based on a number of the plurality of cylinder heads, where there is one support leg positioned between adjacent cylinder heads.

9. The vehicle system of claim 1, further comprising a turbocharger positioned at an end of the engine and wherein the exhaust gas treatment device includes a selective catalytic reduction catalyst disposed downstream of the turbocharger.

10. The vehicle system of claim 1, further comprising a turbocharger positioned at an end of the engine and wherein the exhaust gas treatment device includes an oxidation catalyst and a particulate filter disposed upstream of the turbocharger.

11. The vehicle system of claim 10, wherein the oxidation catalyst is disposed upstream of the particulate filter and wherein the oxidation catalyst is coated with a low temperature catalyst and the particulate filter is coated with a high temperature catalyst.

12. The vehicle system of claim 11, wherein the low temperature catalyst is configured to operate under a first, low temperature range, and the high temperature catalyst is configured to operate under a second, high temperature range.

13. A vehicle system comprising:
an engine cab defined by a roof assembly and side walls;
an engine positioned in the engine cab such that a longitudinal axis of the engine is aligned in parallel with a length of the engine cab, the engine including an engine block and a plurality of cylinder heads mounted to the engine block, each cylinder head of the plurality of cylinder heads being a single cylinder head separately mounted to the engine block;
a support structure mounted to the plurality of cylinder heads via a plurality of support legs, where a first end of each support leg of the plurality of support legs is removably coupled to a respective cylinder head of the plurality of cylinder heads and positioned between adjacent cylinder heads; and
an exhaust gas treatment device supported vertically above the engine by the support structure within a space defined by a top surface of an exhaust manifold of the engine, the roof assembly, and the side walls of the engine cab such that a longitudinal axis of the exhaust gas treatment device is aligned in parallel with the longitudinal axis of the engine, the exhaust gas treatment device configured to receive exhaust gas from the exhaust manifold of the engine.

14. The vehicle system of claim 13, wherein the exhaust gas treatment device includes at least one selective catalytic reduction catalyst.

15. The vehicle system of claim 13, wherein the exhaust gas treatment device is a non-selective catalytic reduction catalyst system including a particulate filter and an oxidation catalyst and not a selective catalyst reduction catalyst.

16. The vehicle system of claim 13, wherein the plurality of support legs includes a first set of support legs and a second set of support legs and wherein the support structure further includes:
a first platform angled away from a centerline of the support structure and a second platform positioned opposite the first platform with respect to the centerline, the second platform angled away from the centerline,
wherein a second end of each support leg of the first set of support legs is coupled to the first platform and the first end of each support leg of the first set of support legs is coupled to a mounting bracket of the respective cylinder head and wherein a second end of each support leg of the second set of support legs is coupled to the second platform and the first end of each support leg of the second set of support legs is coupled to a mounting bracket of the respective cylinder head;
a first set of coil isolators coupled to the first platform; and
a second set of coil isolators coupled to the second platform, where the exhaust gas treatment device sits on the first set of coil isolators and the second set of coil isolators.

17. The vehicle system of claim 16, wherein each coil isolator of the first set of coil isolators and the second set of coil isolators includes an elastic coil positioned between a first plate and a second plate, the first plate mounted to one of the first platform and the second platform and the second plate configured to receive a load.

18. The vehicle system of claim 16, wherein coil isolators of the first set of coil isolators are positioned a distance away from one another, along a first length of the first platform, and coil isolators of the second set of coil isolators are positioned the distance away from one another, along a second length of the second platform, the second length the same as the first length.

19. A vehicle system comprising:
an engine cab defined by a roof assembly and side walls;
an engine including plurality of cylinder heads and an engine block, each cylinder head of the plurality of cylinder heads being a single cylinder head separately mounted to the engine block, the engine positioned in the engine cab such that a longitudinal axis of the engine is aligned in parallel with a length of the engine cab;
a support structure including two platforms and a plurality of support legs, where a first end of each support leg is coupled to one of the two platforms and a second end of each support leg is coupled to one of the plurality of cylinder heads and positioned between adjacent cylinder heads, where the two platforms are positioned vertically above the engine and extend along a length of the engine with respect to the longitudinal axis of the engine; and
an exhaust gas treatment device mounted to the two platforms and disposed within a space defined by a top surface of the two platforms, the roof assembly, and the side walls of the engine cab, where a longitudinal axis of the exhaust gas treatment device is aligned in parallel with the longitudinal axis of the engine, the exhaust gas treatment device configured to receive exhaust gas from an exhaust manifold of the engine.

20. The vehicle system of claim 19, wherein the vehicle system is a locomotive system, and wherein each support leg of the plurality of support legs includes a first segment, a base, a mounting face, and a second segment, the first segment coupled to the base, the base mounted to a mounting surface of a respective cylinder head of the plurality of cylinders heads, the mounting face coupled to one of a first rail and a second rail, the first rail coupled to a first platform of the two platforms and the second rail coupled to a second platform of the two platforms, and the second segment coupled to the base and the first segment.

* * * * *